United States Patent [19]
Chapin et al.

[11] Patent Number: 5,104,433
[45] Date of Patent: Apr. 14, 1992

[54] METHOD OF MAKING OPTICAL FIBER

[75] Inventors: J. Thomas Chapin, Alpharetta; Addison G. Hardee, Jr., Dunwoody; Lisa M. Larsen-Moss, Stone Mountain; Charles M. Leshe; Bob J. Overton, both of Lawrenceville; John W. Shea, Chamblee; Carl R. Taylor, Lawrenceville; John M. Turnipseed, Lilburn, all of Ga.

[73] Assignee: AT&T Bell Laboratories, Murray Hill, N.J.

[21] Appl. No.: 529,992

[22] Filed: May 29, 1990

Related U.S. Application Data

[62] Division of Ser. No. 351,984, May 15, 1989, Pat. No. 4,962,992.

[51] Int. Cl.$^5$ .............................................. C03C 25/02
[52] U.S. Cl. ........................................ 65/3.1; 65/60.2; 65/60.3
[58] Field of Search .......................... 65/3.1, 3.11, 3.12, 65/3.13, 3.4, 60.2, 60.3; 350/96.23; 427/54.1

[56] References Cited

U.S. PATENT DOCUMENTS

| | | | |
|---|---|---|---|
| 4,105,284 | 8/1978 | Olshansky | 350/96.33 |
| 4,324,575 | 4/1982 | Levy . | |
| 4,474,830 | 10/1984 | Taylor | 427/54.1 |
| 4,765,712 | 8/1988 | Bohannon et al. | 350/96.23 |
| 4,913,859 | 4/1990 | Overton et al. | 264/22 |

FOREIGN PATENT DOCUMENTS

| | | |
|---|---|---|
| 213680 | 3/1987 | European Pat. Off. . |
| 2723587 | 12/1977 | Fed. Rep. of Germany . |
| 211707 | 12/1983 | Japan . |
| 2145841 | 4/1985 | United Kingdom . |

OTHER PUBLICATIONS

DeSoto Product Information Sheets for DeSolite® Secondary Coating 950-103, Apr. 1989, 4 pages.

*Primary Examiner*—Richard V. Fisher
*Assistant Examiner*—John J. Bruckner
*Attorney, Agent, or Firm*—E. W. Somers

[57] ABSTRACT

Methods are provided for making an optical fiber transmission medium which includes optical fiber (21) provided with a coating system (31) typically including two layers each of a different coating material. An inner layer (32) of a first coating material is called the primary coating and an outer layer is termed the secondary. In order to achieve desired performance characteristics, performance is related to properties of a coating system. The coating materials have well defined moduli and the second coating material has an elongation which is substantially less than in prior secondary coating materials. Adhesion levels which are optimized rather than maximized are substantially stable with respect to time. Curing of the coating materials may be accomplished simultaneously or in tandem with the application separately of the coating materials.

9 Claims, 15 Drawing Sheets

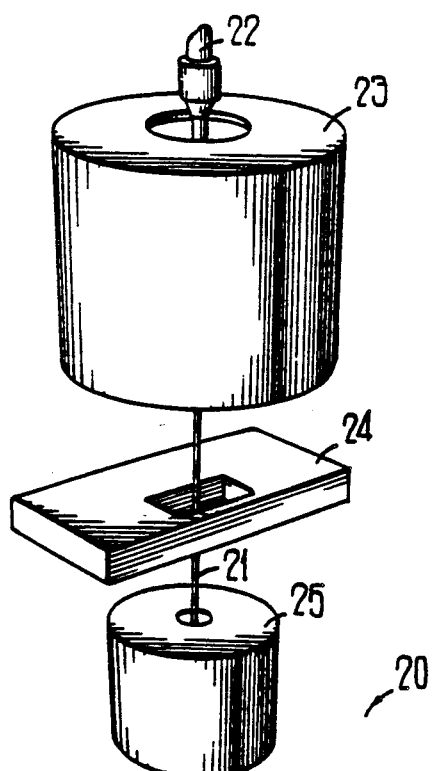
FIG A
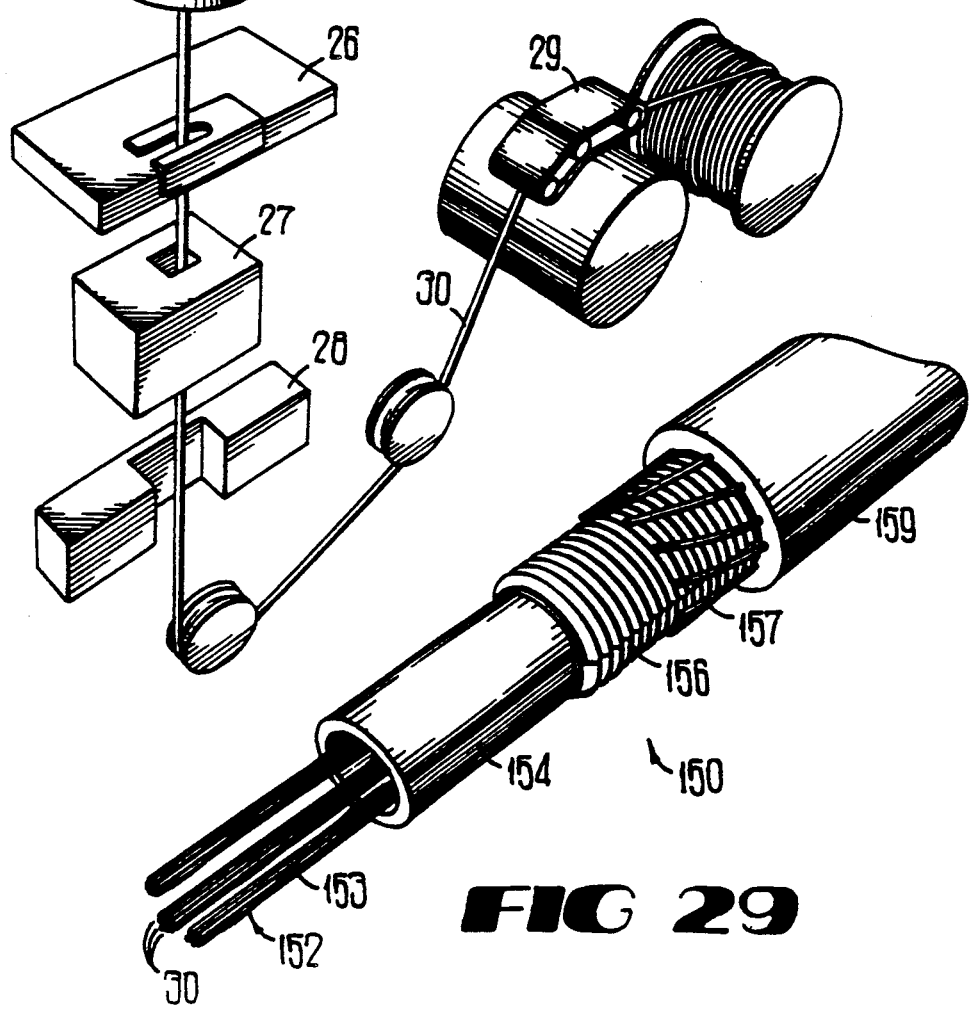
FIG 29

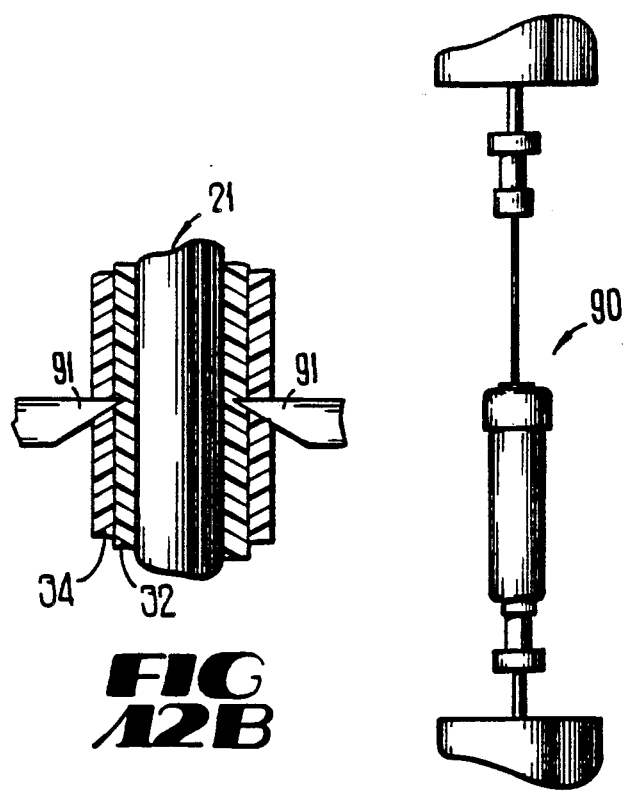
FIG 12B
FIG 12A
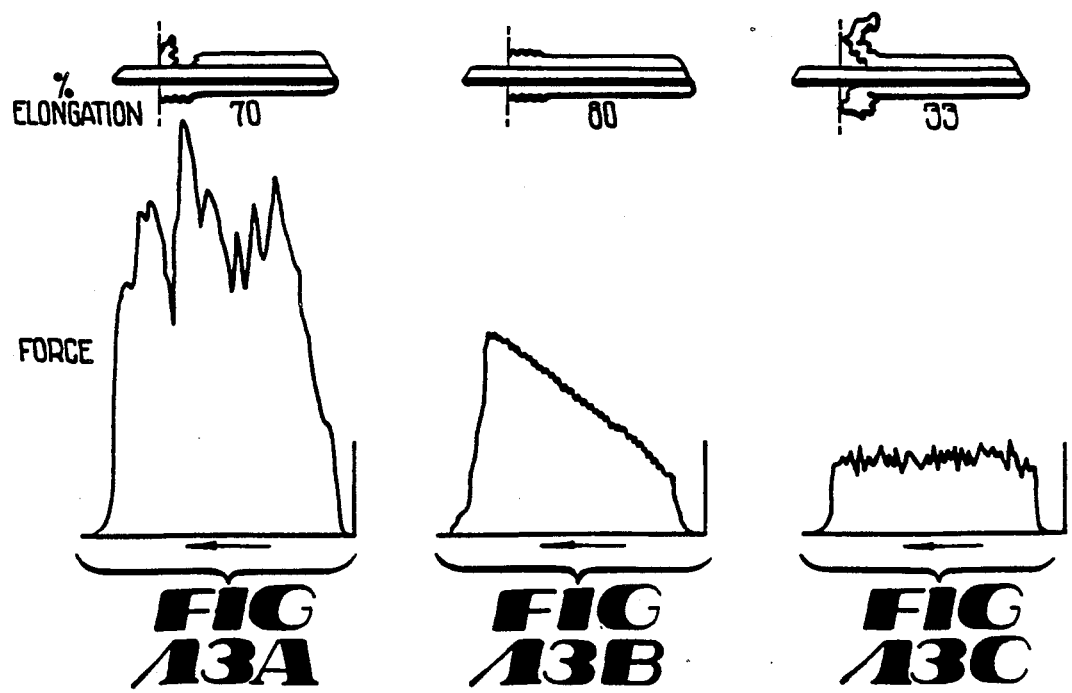
FIG 13A
FIG 13B
FIG 13C

METHOD OF MAKING OPTICAL FIBER This is a division of application U.S. Ser. No. 07/351,984 filed May 15, 1989, now U.S. Pat. No. 4,962,992.

TECHNICAL FIELD

This invention relates to methods of making optical fiber cable. More particularly, the invention relates to a cable which includes optical fiber transmission media which are provided with one or more polymeric coatings each of which is characterized by a set of properties.

BACKGROUND OF THE INVENTION

In the manufacture of optical fiber cable, a glass preform rod which generally is manufactured in a separate process is suspended vertically and moved into a furnace at a controlled rate. The preform softens in the furnace and optical fiber is drawn freely from the molten end of the preform rod by a capstan located at the base of a draw tower. Subsequently, one or more optical fiber is provided with a sheath system to form an optical fiber cable.

Because the surface of the optical fiber is very susceptible to damage caused by abrasion, it becomes necessary to coat the optical fiber, after it is drawn, but before it comes into contact with any surface. Inasmuch as the application of the coating material must not damage the glass surface, the coating material is applied in a liquid state. Once applied, the coating material must become solidified rapidly before the optical fiber reaches a capstan. This may be accomplished by photocuring, for example. The refractive index of the cured coating should desirable be above that of the outer layer of glass of the optical fiber.

Optical fiber performance properties which are affected most by the coating material include strength, resistance to microbending transmission loss, strippability and abrasion resistance. Coating defects which may expose the optical fiber to subsequent damage arise primarily from improper application of the coating material. Defects such as large bubbles or voids, non-concentric coatings with unacceptable thin regions, or intermittent coatings must be avoided. When it is realized that the coating thickness may be as much as the radius of an optical fiber, it becomes apparent that non-concentricity can cause losses in splicing, for example.

Transmission losses, for example, may occur in optical fibers because of a mechanism known as microbending. Optical fibers are readily bent when subjected to mechanical stresses, such as those encountered during placement in a cable or when the cabled fiber is exposed to varying temperature environments or mechanical handling. If the stresses placed on the fiber result in bending distortion of the fiber axis with periodic components typically ranging from the micron to the centimeter range, light propagating in the fiber core may escape therefrom. These losses, termed microbending losses, may be very large. Accordingly, the fiber must be isolated from stresses which cause microbending. The properties of the fiber coating play a major role in providing this isolation.

Two types of coating system have been used to overcome this problem. Single coatings, employing a relatively high shear modulus, e.g. over a range of about 1000 to 500,000 psi, have been used in applications requiring high fiber strengths or in cables which employ buffer tubes where fiber sensitivity to microbending is not a significant problem.

Dual coated optical fibers typically are used in cable to obtain design flexibility and improved performance. Typically, a dual coated optical fiber which includes a coating system comprising an inner or primary coating layer characterized by a relatively low modulus material is applied to the optical fiber. The modulus of the primary coating should be effective in reducing the stress transmitted to the glass by an external lateral force thus reducing microbending of the glass. Primary coating materials have been characterized by an equilibrium modulus of elasticity in the range of about 50 psi to 200 psi. Equilibrium modulus may be defined as the final modulus that a crosslinked material will reach in time or at high temperatures. This modulus is chosen so that the primary coating achieves its principal purpose i.e., the attenuation and uniform distribution, of stress supplied to the fiber. Through this attenuation and distribution, losses due to microbending are substantially reduced. See L. L. Blyler, Jr. and C. J. Aloisio, *ACS Symposium*, Series No. 285, Applied Polymer Science, pp. 907–930, 1985, for a description and definition of microbending losses. Clearly, the primary coating itself should not introduce excessive stress during application or use. Such a material reduced microbending losses associated with the cabling, installation or environmental changes during the service life of the optical fiber. In order to meet temperature conditions in expected areas of use, the low modulus coating material desirably should be effective in the range of about $-50°$ to $85°$ C.

Typically, the primary coating material also should yield, upon exposure to actinic radiation, a layer that is adherent to the optical fiber, i.e., requires at least 500 and preferably 1000 grams force for separation from the fiber. However, that value should be less than 3200 grams to facilitate removal and to avoid tenacious residues.

An outer or secondary coating layer typically comprising a relatively high modulus material is applied over the primary layer. The outer coating layer is usually of a higher modulus material to provide abrasion resistance and low friction for the coated fiber. The dual coating materials serve to cushion the optical fiber by way of the primary layer and to distribute the imposed forces by way of the secondary layer, so as to isolate the optical fiber from bending moments.

The properties of adhesion and appropriate modulus behavior are necessary to yield a suitable fiber. However, for ease of fabrication, it is also desirable that the primary coating material cure to an appropriate equilibrium modulus level over a wide range of relatively low doses. Dose is defined as the incident radiation or quantity of radiant energy impinging on the coating system. The physical volume in which an exposure source, e.g., a lamp emitting ultra violet light (UV), for example, can be placed on a fiber drawing and coating apparatus is limited. This limitation, in turn, restricts the dose available for curing and necessitates the use of a material that cures at low doses. Additionally, since the intensity of radiation sources employed for curing are generally not variable, any change in drawing speed produces a concomitant change in dose. Aging of the radiation source and/or deposition of materials on its external surfaces also induces dose variation. Accordingly, to produce a consistently acceptable fiber, the primary coating should cure over a wide range of low doses to within a specified range of equilibrium modulus. A coating whose modulus strongly varies with curing dose will result in a wide variation in modulus range and fiber performance.

The coating materials should be characterized by predetermined properties in order to achieve desired performance characteristics. Properties which provide strength must characterize the coated optical fiber while not adding to the transmission loss performance of the optical fiber. Further, the coating system must be such that it is strippable from the underlying glass without undue force or tenacious residues and such that the stripped fiber is capable of easily being terminated by any of a variety of arrangements available in the marketplace. Also, the primary coating material should have a suitable refractive index which is higher than that of the cladding. Both the primary and the secondary coating materials should be as hydrophobic as possible to prevent the accumulation of moisture at the interface between the primary coating material and the glass or cause a phase separation into water-rich region within the material. The primary coating material should have suitable microbend resistance maintained to low temperatures to avoid transmission losses in cables. The secondary coating material should have suitable microbend resistance, abrasion and cut-through resistance and require a reasonably low strip force for removal. Of course, the cure speed of the coating system is very important in the manufacture of optical fiber to produce a consistent product within allowable manufacturing variations. The lowest UV dose at which the coating modulus is in the specified range of values is considered its cure speed.

All the above properties have been known for some time and yet fiber performance has been affected adversely by coating systems in use today. What seemingly has not been done is to determine the interrelationship of various properties of coating materials so that coating materials are characterized simultaneously by a set of properties which are optimized but not necessarily maximized.

For coating materials of the prior art, the change of properties with time is more than desired. Cables are designed according to coating properties at fiber draw. If those properties change with respect to time, the selected cable design may be inadequate and cause problems. Hence, it should be apparent that the absence of change with aging is important. In other words, the requirements must be met by specific compositions over a range of temperatures and humidity. Prior art coating systems do not appear to provide stability over time and throughout these range of conditions. For example, they do not age well in hot, humid conditions. Under such conditions, the properties of commercially available prior art coating materials change. In other words, under those conditions, the prior art coating materials experience chemical instability. Further, the adhesion and the glass transition temperature change over time, yellowing occurs and the coating material becomes opaque because of separation of water-rich regions due to moisture absorption.

Also, the prior art coating materials cure incompletely at relatively low doses. In an effort to reduce coats, it becomes an objective to provide coating materials which include more reactive ingredients to facilitate more rapid curing of the materials. It also is important in manufacture that the coating material undergo substantially cure so that the amount of non-reacted material is minimized. Non-reacted materials diffuse out with age, causing a change in properties such as surface quality resulting in a tacky surface, for example.

What is needed and what seemingly is not available in the prior art is an optical fiber cable which includes coated optical fiber including properties which characterize its coating system to provide desired performance characteristics. Included in those characteristics are low loss, suitable strength, suitable strippability and adequate cut-though resistance. Needed also are a modulus spectrum and a glass transition temperature which together with elongation and adhesion, for example, provide the desired characteristics. Although some of those property demands have been achieved piecemeal to achieve specific desired performance characteristics, the art has not recognized nor provided a global solution as to how to achieve the totality of properties. What is sought is a solution set of properties which must be met by a particular composition or compositions of a coating system of an optical fiber if that system is to meet desired performance characteristics.

SUMMARY OF THE INVENTION

The foregoing problems of the prior art have been solved by the methods of this invention for making optical transmission media. An optical fiber cable which is made by the methods of this invention includes coated optical fiber comprising an optical fiber which includes a core and a cladding. The optical fiber is enclosed substantially in a coating system which includes an inner layer of a primary coating material. Surrounding the primary coating material is an outer layer of a secondary coating material. A solution set of properties characterized the primary and the secondary coating materials in order to meet performance requirements.

The primary coating material is one which is characterized by a modulus spectrum and a glass transition temperature which are such as to provide suitable resistance to microbending over a predetermined temperature range. Also, the primary coating material is characterized by an adhesion which is substantially uniform and continuous and free from delamination and heterogeneous materials at the interface between the optical fiber and the primary coating material. Advantageously, the adhesion is optimal and not so high as to result in tenacious residues on the optical fiber when the coating system is removed from the optical fiber. The secondary coating material has a sufficiently low glass transition temperature to inhibit delamination of the coating system from the optical fiber and to provide suitable resistance to microbending. The properties of the coating materials of the coating system are maintained notwithstanding exposure to a relatively high humidity and relatively long aging conditions.

In a preferred embodiment, the modulus of the primary coating is in the range of about 70 to 150 psi and the glass transition temperature does not exceed a value of about $-40°$ C. Also, the glass transition temperature of the secondary coating material is such that the secondary coating material provides cut-through and abrasion resistance over the expected operating temperature range, but is not greater than about 60° C. If it were greater than about 60° C., outward radial forces generated by differences in expansion coefficient between the primary and the secondary coating material will cause increased problems of delamination, for example. Further, the secondary coating material is characterized by a glass transition temperature which sufficiently low to allow the secondary coating material to relax with time and to become relatively compliant.

BRIEF DESCRIPTION OF THE DRAWING

Other features of the present invention will be more readily understood from the following detail description of specific embodiments thereof when read in conjunction with the accompanying drawings, in which:

FIG. 1 is an overall perspective view of a portion of a manufacturing line on which optical fiber for use in optical fiber cable, for example, is drawn from a preform and covered with one or more layers of a coating system;

FIG. 12(A–B) is a schematic view of an arrangement for measuring the force required to strip the coating system from the coated optical fiber;

FIGS. 13A, 13B, 13C are views showing the stripping of and force required to strip coating materials from prior art and optical fiber of the invention;

FIG. 29 is a perspective view of an optical fiber cable made by the methods of this invention.

DETAILED DESCRIPTION

Figure 2:
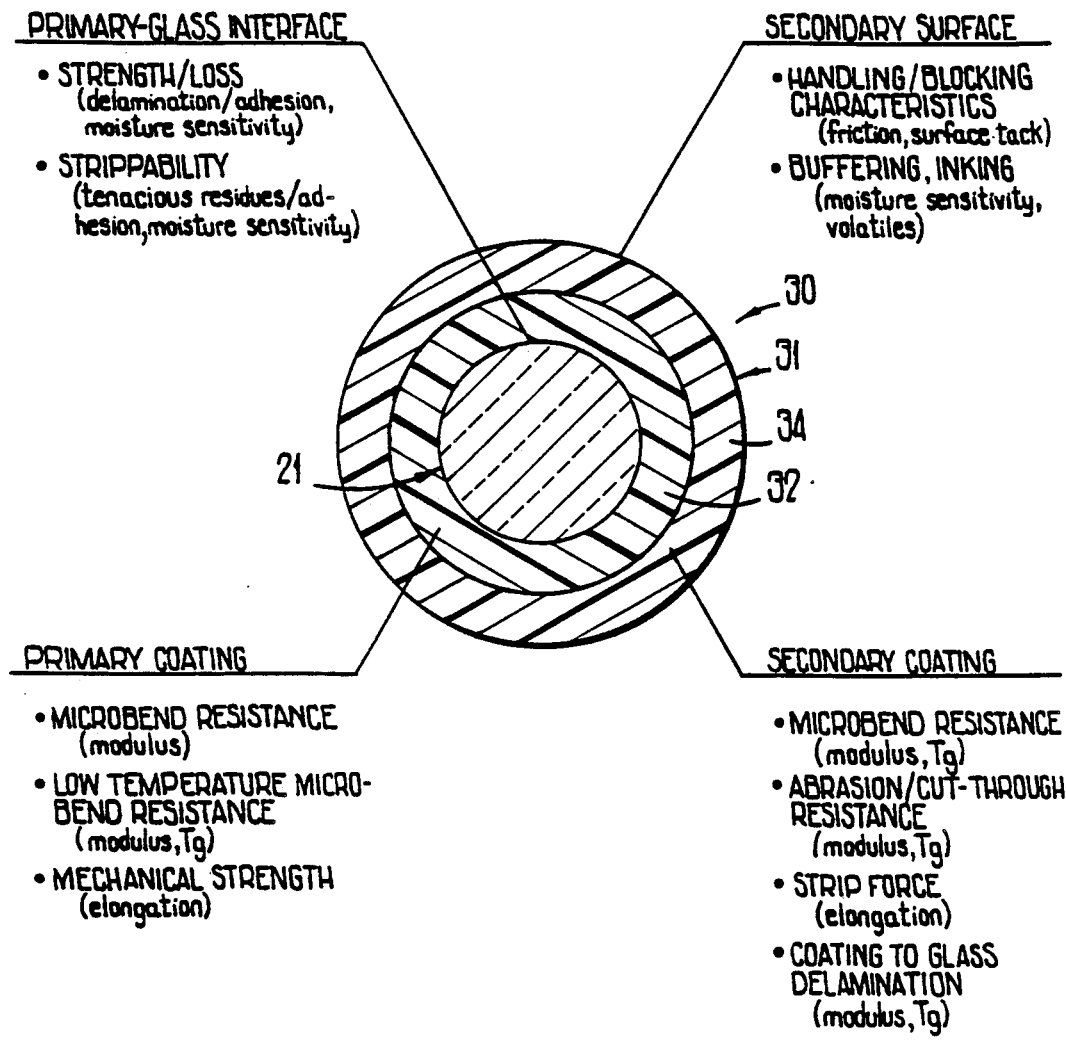
FIG. 2 is an end sectional view of an optical fiber having two layers of coating materials, a primary coating material and a secondary coating material, comprising a coating system applied to the fiber.

Referring now to FIG. 1, there is shown an apparatus which is designated generally by the numeral 20 and which is used to draw an optical fiber 21 in accordance with methods of this invention from a specifically prepared cylindrical preform 22 and then to coat the optical fiber. The optical fiber 21 is formed by locally and symmetrically heating the preform 22 to a temperature of about 2000° C. As the preform 22 is fed into and through a furnace 23, optical fiber 21 is drawn from the molten material.

As can be seen in FIG. 1, the draw system includes the furnace wherein the preform 22 is drawn down to the optical fiber size, after which the optical fiber 21 is pulled from the heat zone. The diameter of the optical fiber 21 which is measured by a device 24 at a point below the furnace 23 becomes and input into a control system. Within the control system, the measured diameter is compared to the desired value and an output signal is generated to adjust the draw speed such that the fiber diameter approaches the desired value.

After the diameter of the optical fiber 21 is measured, a protective coating system is applied by an apparatus 25 to provide a coated optical fiber 30. One method of applying dual layers of coating materials to a moving optical fiber is disclosed in U.S. Pat. No. 4,474,830 which issued on Oct. 2, 1984, in the name of C. R. Taylor and which is incorporated by reference hereinto. Another system for applying dual coatings on drawn optical fibers is disclosed in application U.S. Ser. No. 07/342,600 which was filed on Apr. 21, 1989 in the names of B. J. Overton and Carl R. Taylor and now U.S. Pat. No. 4,913,859.

Then, after the coated optical fiber 30 is passed through a concentrically gauge 26, an ultraviolet light (UV) device 27 for treating the coating material to cure the coating material and a device 28 for measuring the outer diameter of the coated fiber, it is moved through a capstan 29 and is spooled for testing and storage prior to subsequent operations or sale. The preservation of the intrinsically high strength of optical fibers is important during their ribboning, jacketing, connectorization and cabling and during their service live.

A coating system 31 (see FIG. 2) which is applied to the optical fiber after it has been drawn from the preform preferably comprises two layers of radiation cured polymeric materials. An inner layer 32 is referred to as the primary coating material and an outer layer 34 which is referred to as the secondary coating material. Typically, the primary and the secondary coating layers each have a thickness of about 30 μm.

The coated optical fiber 30 must meet desired performance characteristics (see FIG. 2). For example, the coated fiber must have excellent transmission characteristics. It must remain intact although subjected to handling and the environment, it must be capable of being connected to other coated optical fiber or to devices and it must be capable of being tested.

More specifically, the interface between the primary coating material and the glass fiber must be characterized by suitable strength to prevent delamination and must be such that the coatings system can be stripped from the optical fiber without tenacious residues being left on the fiber surface. On the other hand, the surface of the secondary coating material must be such that tacking does not occur between adjacent convolutions of the fiber (blocking), resulting in a jerky payoff from a process spool. Also, the outer surface of the secondary coating must be such that it is compatible with the application of a relatively thick extruded overcoating which may be referred to as buffering and/or colorant materials used for identification in multifiber units.

Further, the primary coating material must have suitable resistance to microbending, extending to low temperatures, and suitable mechanical strength. The secondary coating material also must have suitable resistance to microbending, adequate abrasion and cut-through resistance and must not cause the force required to remove the coating system from the fiber to be too high.

Coating materials influence fiber loss by the mechanism of microbending. Coating materials buffer the glass fiber from outside bending forces and without the coating materials, the glass cannot be handled. As temperature drop, the coating materials stiffen which will increase the possibility of microbending loss. The secondary coating material must be robust for purposes of handling and must resist external damage. The properties which characterize the primary and secondary coating materials must be correlated as they relate to performance, remembering that together they characterize a composite coating system.

In order to meet above-disclosed desired characteristics, a solution set of properties characterized the coating system 31 of the coated optical fiber 30. What was not apparent before this invention was how the change in properties is achieve in order that the coated optical fiber has all the desired performance characteristics (see again FIG. 2). As for the coating system, it must not introduce added loss into the transmission. It must have acceptable strength characteristics to protect the optical fiber. Further, the coating system must be such that it is removed easily from the optical fiber so that the fiber may be connected to other fiber or devices. Also, the cut-through resistance of the secondary coating material must be such that it permits testing of the coated optical fiber and subsequent handling in buffering and cabling operations.

Advantageously, the coating system of this invention achieves the hereinbefore performance objectives. The performance characteristics of the primary coating to glass interface are achieved by suitable adhesion and moisture sensitivity properties whereas the performance characteristics of the surface of the secondary coating material are controlled by the surface friction and tackiness of that surface as well as the moisture sensitivity and volatiles of the primary coating material.

In order to provide a coated optical fiber having a coating system which meets all of the above performance criteria, it becomes important to determine the interrelationship of the properties which allow the performance criteria to be met. Specific properties then are adjusted to insure that all are met.

Figure 3:
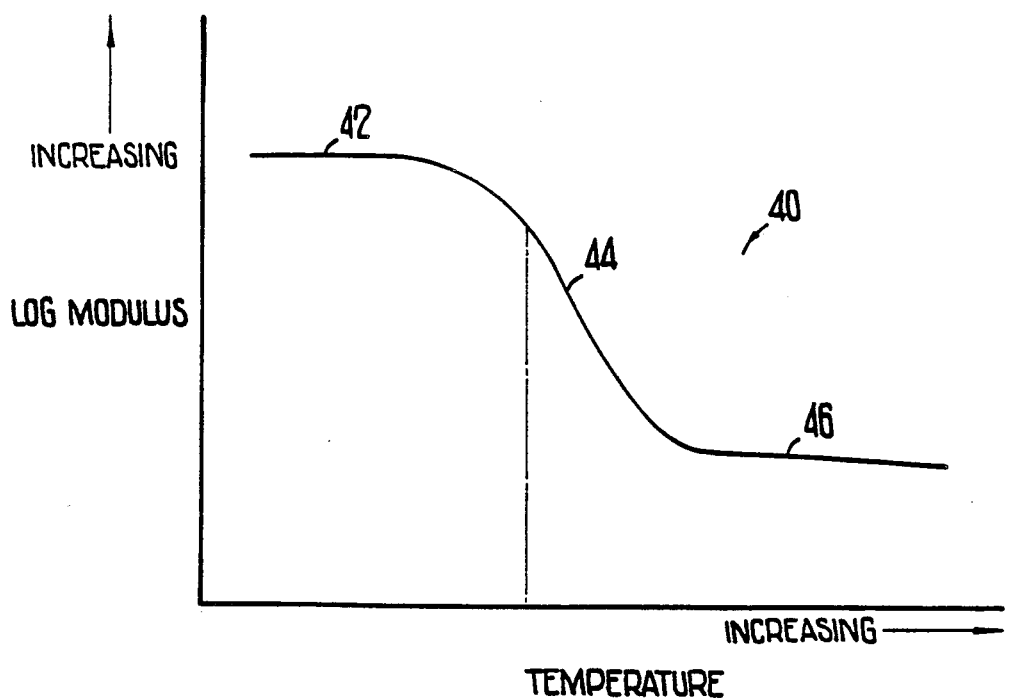
FIG. 3 is a generic logarithmic plot of modulus of a typical coating material versus temperature.

As for the primary coating material, performance is achieved by a cooperation between its modulus spectrum and its glass transition temperature. The modulus of a polymeric material is time and temperature dependent. FIG. 3 illustrates by a curve 40 the general behavior of the modulus of a polymeric material as a function of temperature. A polymer is said to be in the glassy state if it is in a region 42 of the curve, in which the modulus is high and substantially constant. A knee in the curve defines a parameter referred to as glass transition temperature, $T_g$. The glass transition temperature, $T_g$, of a material is the temperature, determined for instance by means of stress/strain measurement, at which the modulus of the material changes from a relatively high value occurring in the lower temperature, glassy state of the material to a lower value occurring in the transition region to the higher temperature, elastomeric state of the material. In FIG. 3, the $T_g$ separates in a transition region 44 the glassy region 42 from a region 46 in which the modulus is relatively low and substantially constant and which is the elastomeric region of the polymer. The relatively low and substantially constant modulus following transition is referred to as the equilibrium modulus.

Microbend resistance as well as abrasion and cut-through resistance of the secondary coating also are achieved by way of its modulus spectrum and glass transition temperature. The abrasion and cut-through resistance and stripping force of the secondary coating are achieved through the properties of modulus, glass transition temperature and elongation.

A coating system 31 of this invention does not introduce an undesired amount of added loss into the optical fiber. This has been accomplished by providing primary and secondary coating materials each having a range of modulus which is such as to avoid the introduction of added loss. For the primary coating material, it has been found that an equilibrium modulus in the range of about 70-200 psi is acceptable and that a range of about 70-150 psi is preferred. If the equilibrium modulus of the primary coating material is too high, unacceptable added loss in single-mode fiber begins to appear under stress conditions at room temperature. On the other hand, if the equilibrium modulus of the primary coating material is too low, fiber buckling inside the primary coating and delamination of the coating system from the optical fiber may occur.

Figure 4:
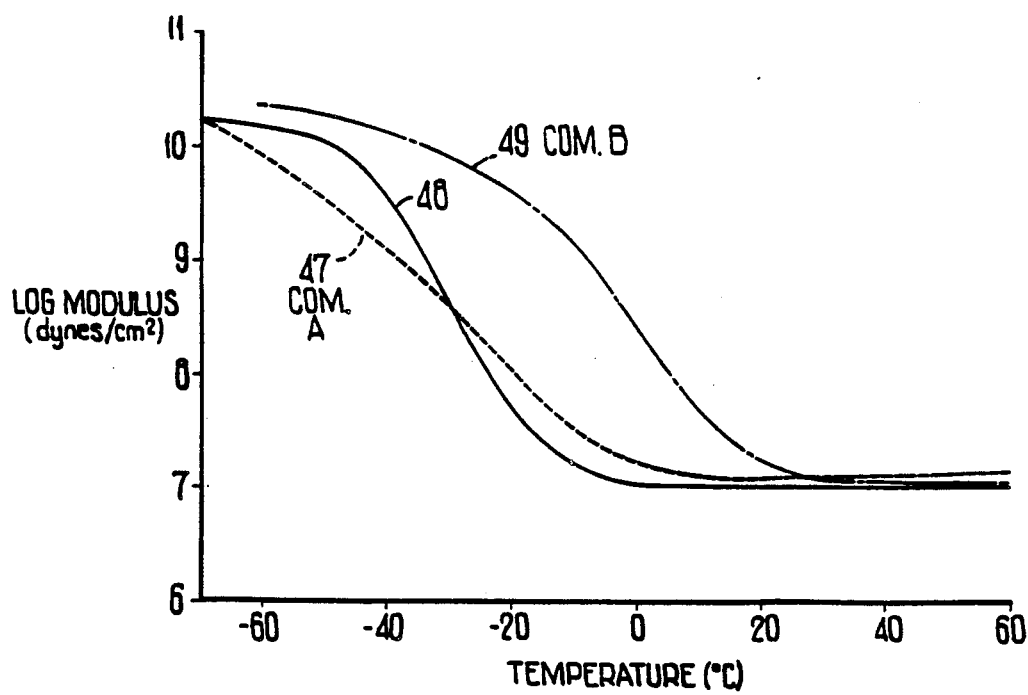
FIG. 4 is a plot of the logarithm of modulus versus temperature of the primary coating material of the coating system of the coated optical fiber of FIG. 2 as well as prior art coating materials.

A plot of the logarithm of modulus versus temperature for the primary coating material of a coating system 31 of a coated optical fiber 30 of this invention is shown by a curve 48 in FIG. 4. A corresponding curve for a prior art primary coating material is designated by the numeral 49. As can be seen, the glass transition temperature of the primary coating material of this coated fiber of this invention is substantially less than that of the prior art represented by the curve 49 and substantially equivalent to that of another prior art coating material represented by a curve 47. In a preferred embodiment, the glass transition temperature of the primary coating material does not exceed a value of about 40° C. A material which is suitable for the primary coating material 32 is disclosed in copending application U.S. Ser. No. 091,151 which was filed on Aug. 28, 1987 and designated M. G. Chan-J. R. Petisce 1—1.

Figure 5:
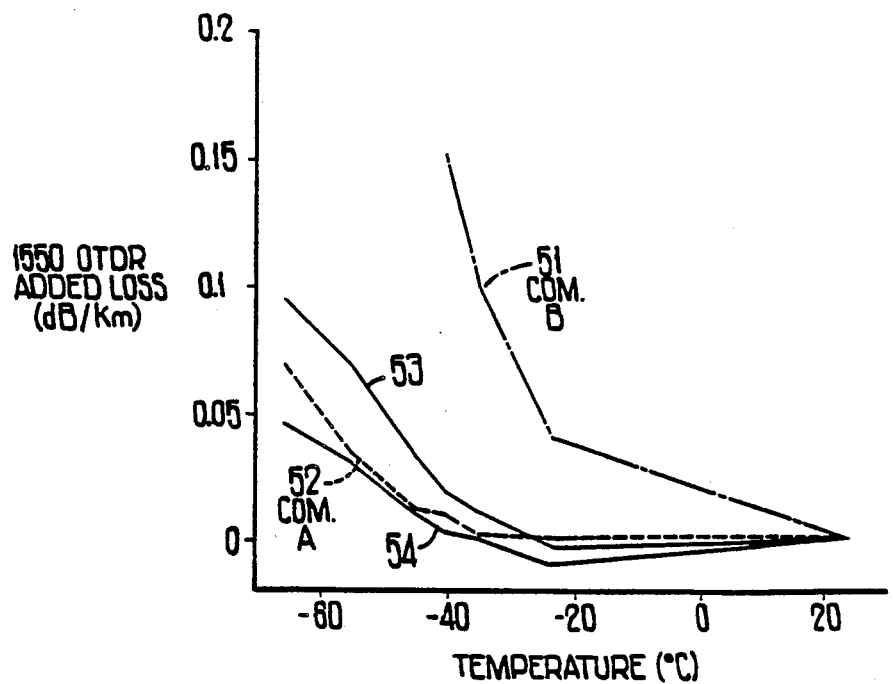
FIG. 5 is a ploy of added loss versus temperature for several coating systems.

Referring now to FIG. 5, there is shown a graph of added loss for a tightly wound fiber versus temperature for each of several coating systems. It should be mentioned that in the drawings, coating materials of this invention and prior art coating materials each are represented by a distinct type of line, solid or dashed, for example. These generally correspond to the coating materials of the system of the coated fiber of this invention and commercially available coating materials which have been designated A through D. A curve designated 51 in FIG. 5 depicts performance of optical fiber provided with a prior art dual coating system. Coating systems of this invention are depicted by curves 53 and 54 which together with a predecessor coating system represented by curve 52 depict substantially less added loss at relatively low temperatures. In accordance with the system used in the figures, it should be understood that the curve 47 in FIG. 4 represents the same material as the curve 52 of FIG. 5.

Also of importance in this regard is the ability to achieve substantial cure of the primary coating material at relatively low doses. This ability of the primary coating material of this invention is portrayed vividly in FIG. 6 which depicts as-drawn, in situ modulus, i.e. modulus measured on the optical fiber, plotted against a parameter referred to as dose factor. Dose factor is defined as the quotient of the number of curing lamps such as UV curing lamps and line speed. As such, it is a relative rating of dose of radiant energy to which an optical fiber coating system is exposed. The modulus of the primary coating material of a coating system 31 is substantially constant and extends from a relatively low dose factor of about 0.1 to a value of about 2. An example in accordance with this invention is represented by a curve 60 in FIG. 6. Whereas the coating system of this invention is characterized by substantially complete cure over a relatively wide range of dose factor, a prior art coating material represented by curve 62 shows that over the same dose factor region, the as drawn in situ modulus changes dramatically. This may result in a product with large primary coating variations in manufacture.

Figure 7:
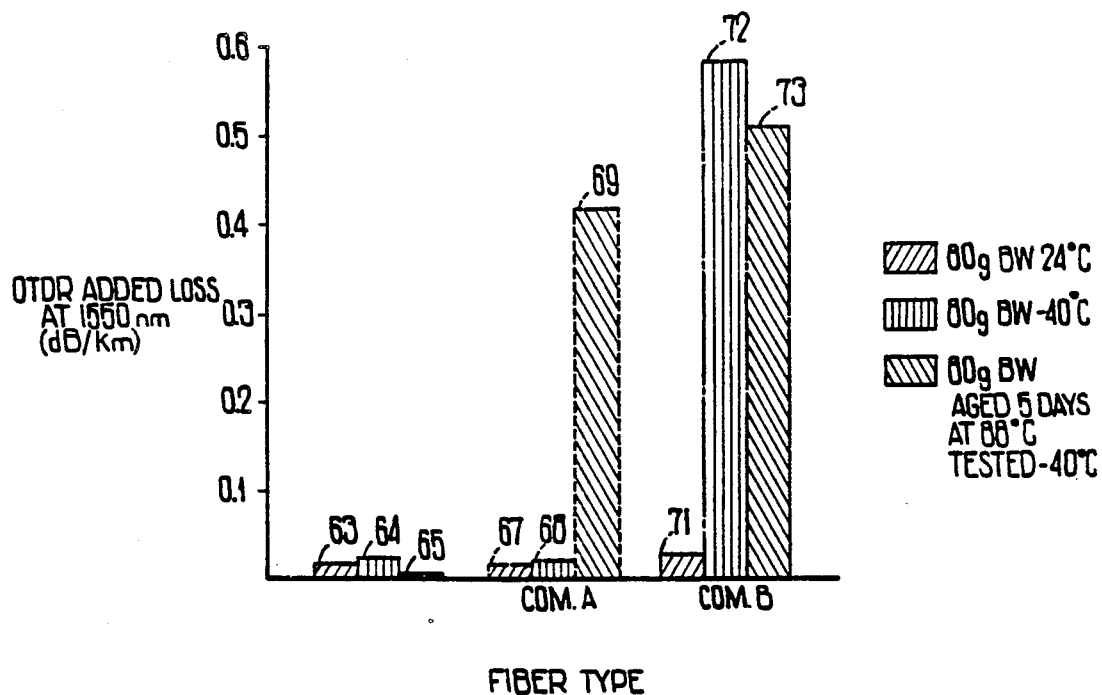
FIG. 7 is a bar chart for tension winding loss performance which depicts added loss for prior art coated fiber and coated optical fiber of this invention at room temperature, at −40 ° C. and at −40° C. after having been aged.

FIG. 7 depicts tests of coated optical fiber would loosely under low tension, measured and then rewound at high tension such as in a basketweave pattern and then remeasured. A basketweave winding pattern is one in which there are several fiber crossover points for each wound convolution. Coated optical fiber of this invention is represented by bars 63, 64 and 65 on the left portion of FIG. 7 and prior art coating systems by bars 67, 68, and 69 and by bars 71, 72, and 73 in the center and on the right, respectively. The expectation is for high loss. However, as is seen, there is low added loss due to the softer primary coating material which relates to microbending at −40° C. With one prior art coating, there was acceptable added loss at room temperature and at −40° C. (see bars 67 and 68). But after aging for 5 days at 88° C., the loss increased dramatically when the coating was subjected to −40° C. (see bar 69). With another prior art coating material, unacceptable loss not only occurred after aging for five days but also at −40° C. prior to aging (see bars 73 and 72).

In actuality, it has been found that the prior art coating materials of cured optical fiber become chemically altered by the aging process. Normally, many polymeric materials are not stable with respect to relatively high temperatures and relatively high humidity aging. As a result, they become embrittled and their modulus behavior is substantially different from that depicted in FIG. 4. On the other hand, the properties of the coating materials of the coated optical fiber of this invention are not altered significantly by the aging process and their modulus behavior is stable with respect to time. Coated optical fiber manufactured in accordance with this invention show a substantially reduced effect of aging on the in situ modulus of the primary coating.

Figure 8:
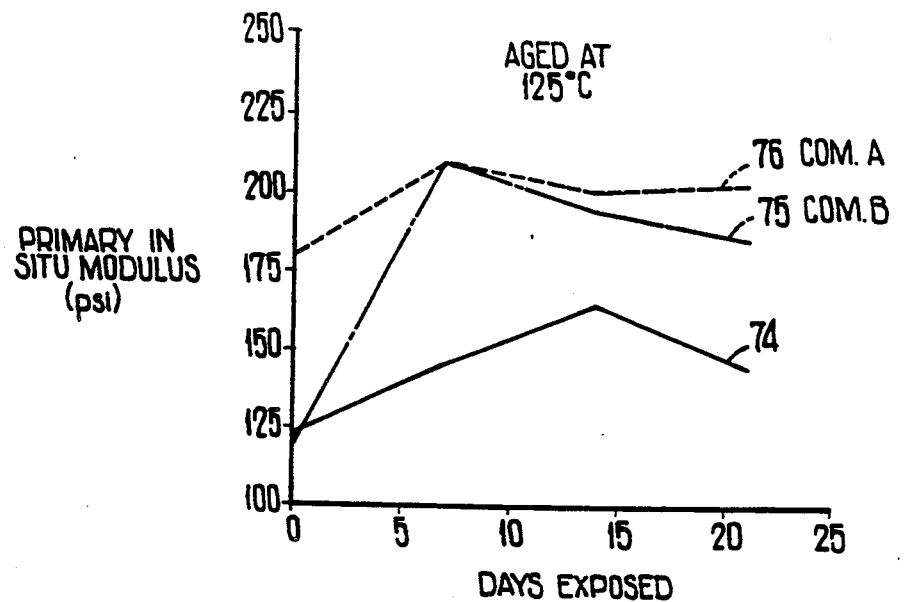
FIG. 8 is a graph which depicts the effect of aging on the modulus of the primary coating material of a dual coated optical fiber at 125° C.

Going now to FIG. 8, there is shown by a curve 74 the effect of aging at 125° C., a high temperature dry environment on the modulus of the primary coating material of a dual coated optical fiber 30. Other prior art materials age poorly. Microbending sensitivity increases as modulus increases. What is desired is a relatively low modulus which is stable over time. On the other hand, as can be seen in FIG. 8, other commercially available prior art coatings represented by curves 75 and 76 experience a significant modulus property change during aging.

Figure 9:
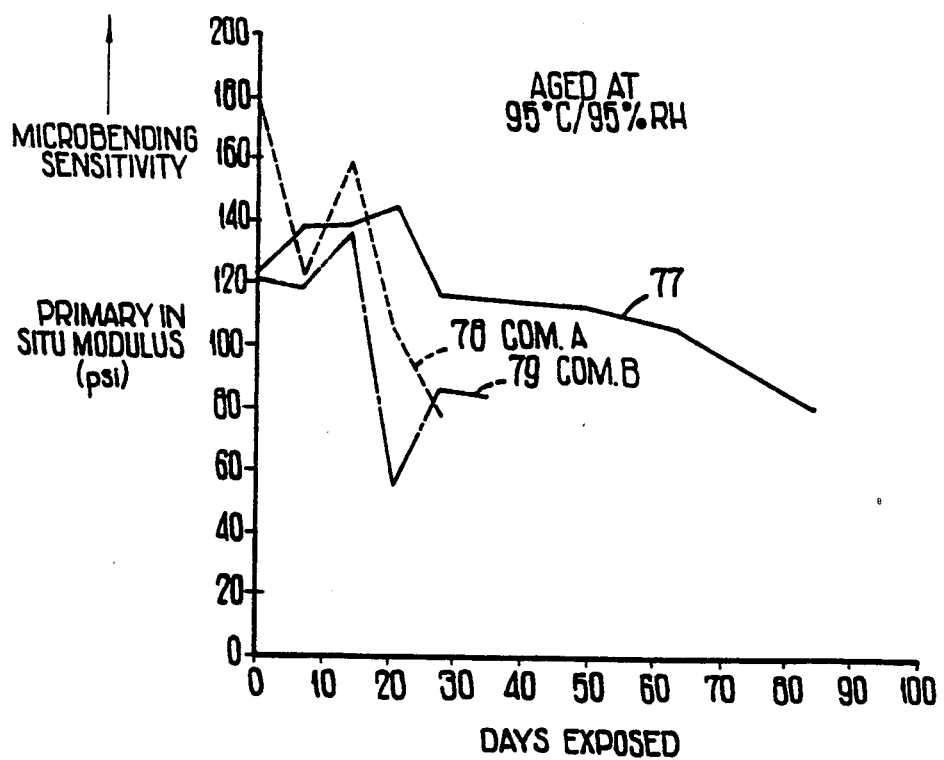
FIG. 9 is a graph which depicts the effect of aging on the primary modulus of a dual coated optical fiber aged at 95° C. and 95% relative humidity.

FIG. 9 depicts the in situ modulus of the primary coating material 32 of a dual coated fiber 30 in a high temperature, high humidity aging test. After about 15 days, prior art coating materials experienced a radical drop in modulus (see curves 78 and 79). The modulus of an example primary coating material 32 which is represented by a curve 77 increases slightly at the beginning of the aging test. On the other hand, in optical fiber including prior art coatings, a drop of 50% was experienced. What is desired and what is maintained is a primary modulus level preferably in the range of about 70–150 psi.

Figure 10:
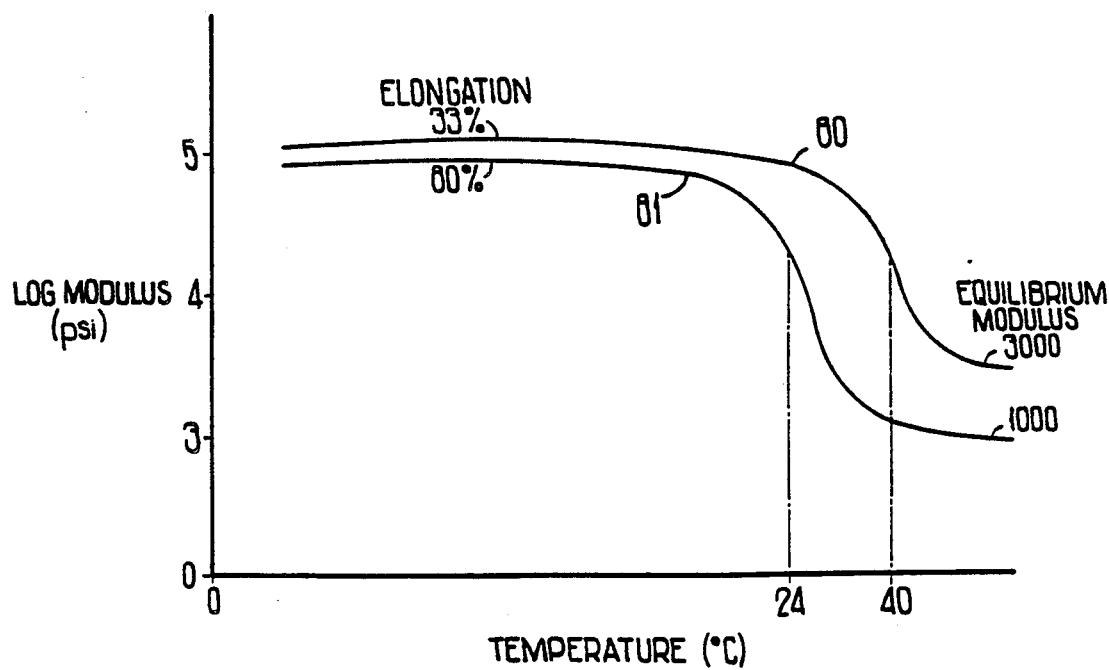
FIG. 10 is a graph of the logarithm of modulus versus temperature for the secondary coating material of this invention.

As for the secondary coating material, its microbend performance must be viewed with respect to its modulus and $T_g$. A plot of the log of modulus versus temperature for the secondary coating material 34 is shown in FIG. 10 and designated by the numeral 80. A curve 81 is associated with a prior art coating material. For the secondary coating material 34 of the coated optical fiber 30, the glass transition temperature is in the range of about 20° to 60° C. Preferably, it is about 40° C. If the lgass transition temperature were below 20° C., the robustness of the optical fiber would be too low for handling in factory conditions because the secondary material would be too soft. If the glass transition temperature of the secondary coating material is too high, delamination of the coating system from the optical fiber may occur, that is, there is an increased tendency for the primary coating material to be lifted from the glass. This occurs because the coefficient of expansion and contraction of the primary coating material is greater than that of the secondary coating material. As a result, the shrinkage of the secondary coating material cannot keep up with that of the primary coating material due to the increased stiffness of the secondary coating below the $T_g$ of the secondary coating material (see FIG. 10). This puts the primary coating material in tension causing it to pull away from the glass. By using a secondary coating material having a lower glass transition temperature, this effect is minimized. A material which is suitable for the secondary coating material 34 is one commercially available from De Soto, Inc. of Des Plaines, Ill. under the designation 950-103.

Figure 11:
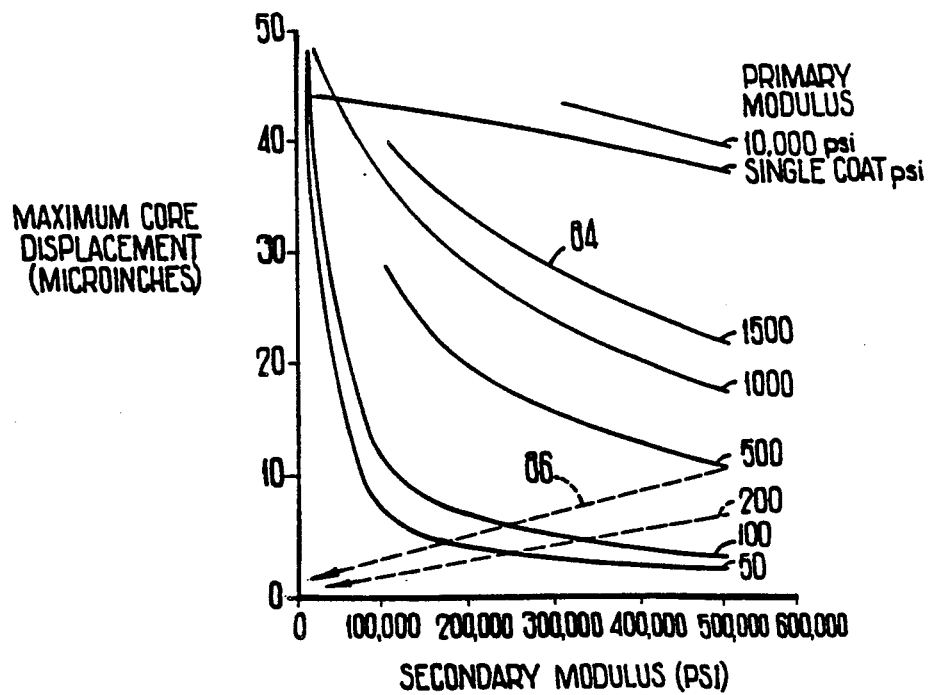
FIG. 11 is a graph which depicts core deflection versus secondary modulus for a plurality of constant load curves and core deflection versus secondary modulus for a plurality of constant deflection curves.

It has been found that it is advantageous from a microbending standpoint to have a secondary material which is compliant. This is an unexpected result in that the prior art typically mandated a relatively soft primary coating material and a relatively hard secondary coating material. This approach of the prior art appears to be necessary for a constant stress condition (see FIG. 11). FIG. 11 shows that, with constant applied load curves 84—84 for increasing primary coating modulus, the curves being calculated, the displacement of the fiber core increases as the secondary coating material modulus decreases. For periodic applied loads having a range of micron to centimeter spacing, the greater the core displacement, the greater the microbending loss. In other words, there is a correlation between loss and core displacement. In use, as the secondary coating material relaxes and its modulus decreases with time and/or temperature, added loss due to microbending decreases as the softness or compliancy of the secondary coating material increases. This is seen by the curves 86—86 in FIG. 11 which are constant applied deflection curves. As is seen, for decreasing secondary coating material modulus, the added loss decreases with time. This finding agrees with cable and tension winding results where added loss due to microbending decreases with increasing time and temperature. In the prior art, a $T_g$ in excess of 85° C. and even in the range of 100° to 120° C. is proposed. If the secondary coating material were so characterized, it would relax so slowly that the core remains deflected instead of returning toward an undeflected condition, thereby resulting in excessive added loss. It is therefore surprising that a substantially lower $T_g$ secondary coating is desirable for microbending resistance. The $T_g$ for the secondary coating material of this invention falls within that lower range. In fact if the $T_g$ is too high and outside the operating temperature range, the secondary coating material may never relax sufficiently to avoid undesired added loss. Clearly, what is needed is that the $T_g$ of the secondary coating material be optimized rather than maximized.

There must be a balance between robustness, strippability and cut-through resistance for which a higher $T_g$ of the secondary coating is needed and a low loss for which a low $T_g$ is needed and a mid-range $T_g$ that avoids delamination. If the $T_g$ is too low, then problems of a higher surface friction and lower cut through resistance and possibly a higher stripping force arise. On the other hand, if $T_g$ is too high, delamination and higher loss will result.

Another property which appears to have been misunderstood and seemingly uncorrelated to other important properties of the coated fiber in relation to optical fiber performance is mechanical strippability. Strippability which is a measure of the ease of removal of the coating system from the optical fiber may be determined by an apparatus 90 shown in FIG. 12. Therein, knife blade 91—91 are caused to cut through the secondary coating material into the primary coating material. What is desired is a coating system which requires a relatively low stripping force for its removal. If it were too high, the fiber may break or the optical fiber cladding may be scraped.

It has been thought by the industry that this property reflects the adhesion of the coating system to the glass. Contrary to this belief, it has been found that the force required to remove the coating system from the optical fiber is a function of the elongation and hence of the glass transition temperature of the secondary coating material. Elongation is intended to mean the strain input into the secondary coating material before it fractures.

The desired elongation is less than about 40% and preferably is about 30%. This is achieved by characterizing the secondary coating material to have a higher glass transition temperature than otherwise might be used. If its $T_g$ is too low, the secondary coating material may be more elastic and its elongation may increase to the detriment of strippability performance. However, what is not desired is a glass transition temperature that is substantially greater that about 60° C., otherwise outward radial stresses created by thermal contraction or volatile losses from the primary coating material can cause delamination from the glass. This would result in high localized non-uniform stresses and losses due to intermittent delamination. As a result of this correlation and compromise, the coating system 31 of this invention requires a relatively low stripping force.

The stripping force is a function of the mechanism of failure of the secondary coating material and how it tears. If an optical fiber is provided with secondary coating material having relatively high elongation, then, as stripping is performed, buckling occurs and the coating materials bunch-up. This is shown in FIGS. 13(A) and 13(B) wherein the elongation values of the secondary coating materials are 70 and 80%, respectively. On the other hand, if the secondary coating material is characterized by a relatively low elongation of 33%, for example, as it is in FIG. 13(C), the coating material during stripping shreds away. As a result, a constant stripping force over length is obtained (see again FIG. 13(C)) whereas with fiber having prior art coating systems, the stripping force ramped up as seen in FIGS. 13(A) and 13(B). Also to be avoided are residues following stripping, otherwise termination procedures are impaired and optical fiber alignment is prevented. If there are any tenacious residues as in the prior art, the fiber must be cleaned prior to termination, but this could result in damage to the fiber surface. With the coated optical fiber of this invention, there are no residues.

Figure 14:
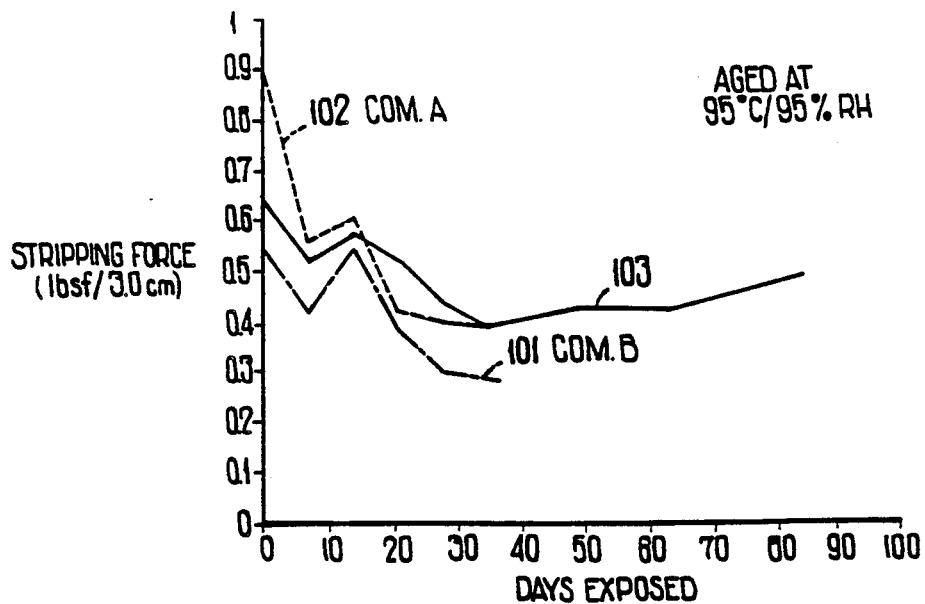
FIG. 14 is a graph which depicts the effect of aging on mechanical stripping force for dual coated fiber aged at 95° C. and 95% relative humidity.

In FIG. 14 is shown the effect of aging at 95° C. and 95% relative humidity on the mechanical stripping force. Optical fiber including prior art coatings represented by a curve 102 was difficult to strip because of the high elongation, i.e., about 70%, of the secondary coating. In a coated optical fiber of this invention as represented by a curve 103, the elongation of the secondary material has been reduced by about 40%. Also of interest here is that a prior art secondary coating material represented by a curve 101 was characterized by a relatively low elongation and hence had suitable strippability. However, this same prior art coating material as shown in FIG. 4 had an unacceptably high modulus. Also the prior art secondary coating material had poor aging properties. This comparison demonstrates that whereas prior art coating materials may have been required to meet some properties, the required properties were not as global as in the coating system of this invention. As seen in FIG. 14, prior art coating systems (as represented by curves 101 and 102) displayed unstable stripping force, i.e. one which decreased with time.

Figure 15:
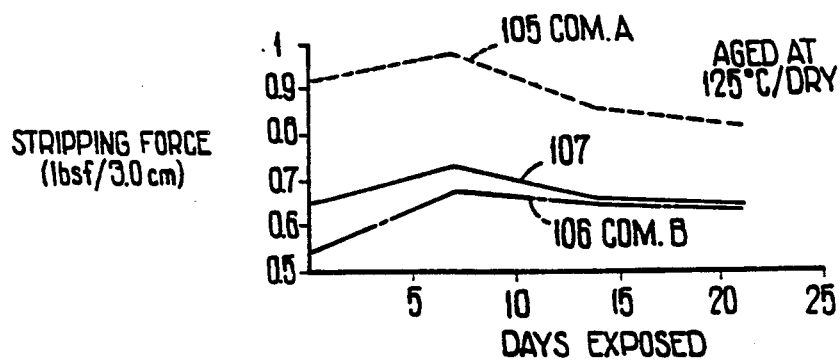
FIG. 15 is graph which depicts the effect of aging on mechanical stripping force for dual coated fiber aged at 125° C.
Figure 16:
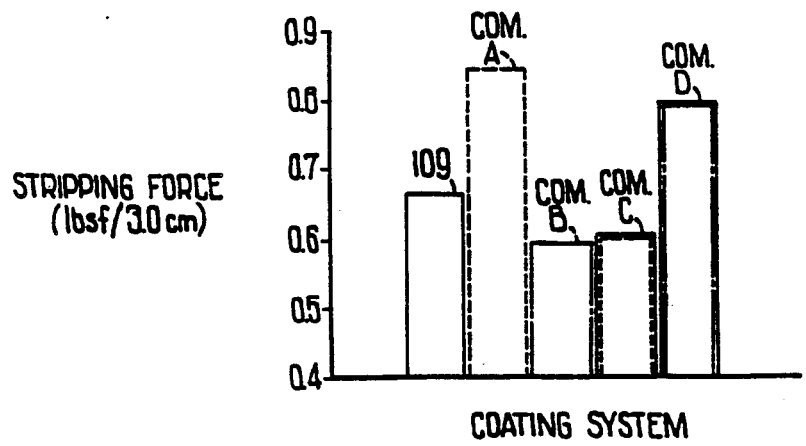
FIG. 16 is a bar chart which shows mechanical stripping force for several coating systems.

FIG. 15 depicts the effect of aging on mechanical stripping force at 125° C. in a relatively dry environment. As is seen, the stripping force is relatively stable for optical fiber coated with prior art systems represented by curves 105 and 106 and for coating systems of this invention represented by a curve 107. A comparison of FIGS. 14 and 15 illustrates how important a role moisture has in leading to instability. FIG. 16 depicts a comparison by bar chart of stripping forces for different coating systems including those of the prior art and one of this invention which is designated by the numeral 109.

Figure 17:
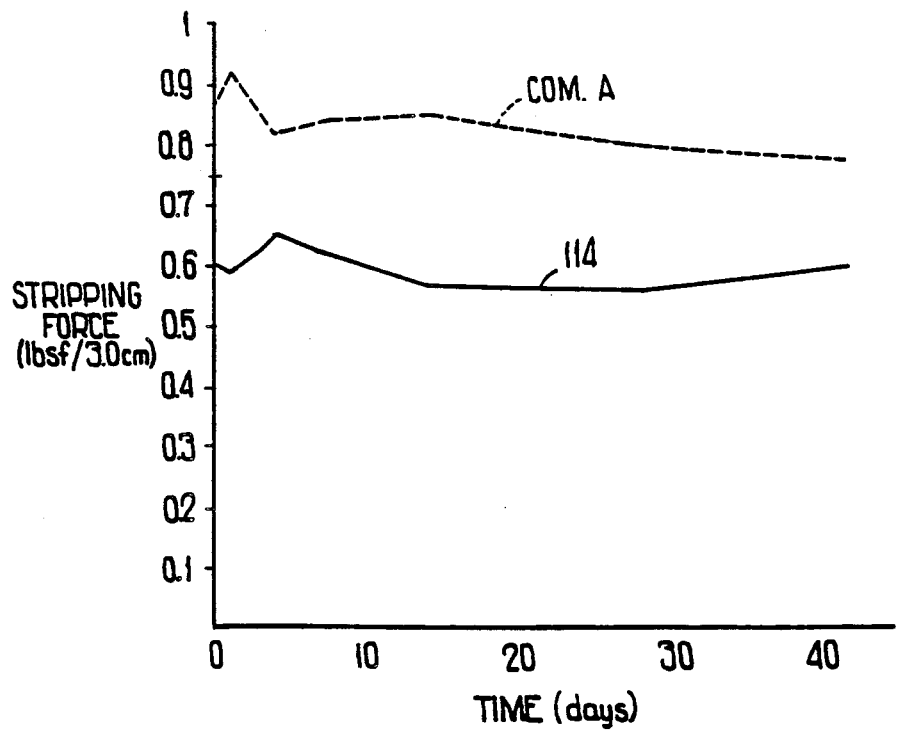
FIG. 17 is a graph of stripping force versus time.
Figure 18:
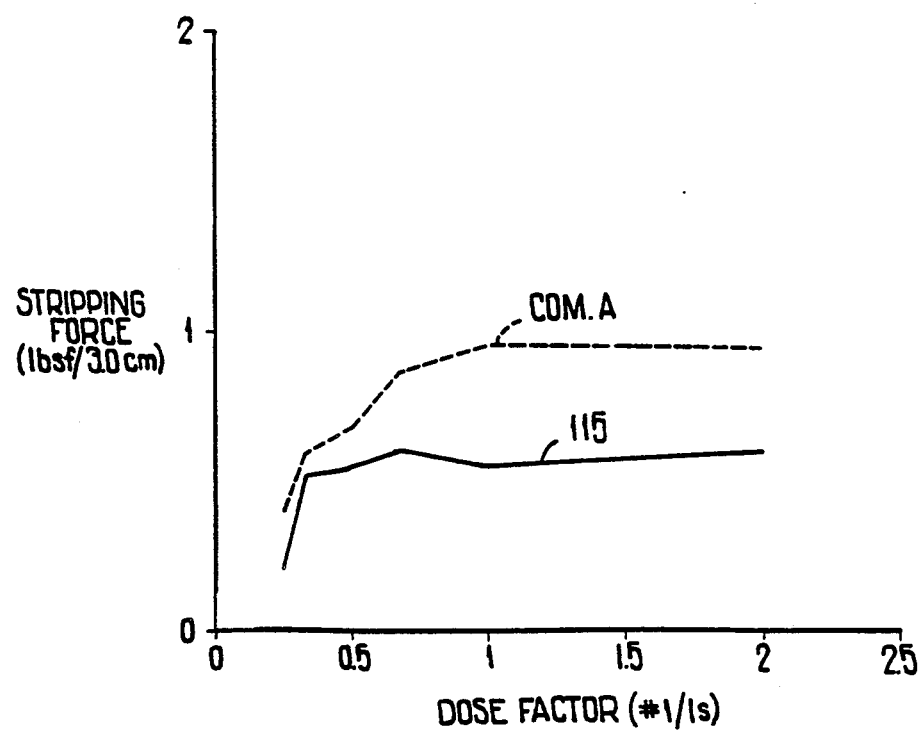
FIG. 18 is a graph of stripping force versus dose factor.

Advantageously, and as can be seen by a curve 114 in FIG. 17, the stripping force of a coating system of this invention is substantially constant with respect to time. Further, the stripping force is substantially constant with respect to a dose factor of between about 0.3 and 2 as shown by a curve designated 115 in FIG. 18.

Strength properties are extremely important to acceptable performance characteristics. There must exist the ability to handle the coated optical fiber. Desirably, the coating system helps to maintain the strength properties of the fiber which are simulated by a reproof test. In order to achieve desired strength properties, there must be suitable adhesion of the coating system 31 to the optical fiber 21. It should be remembered that strippability is not solely dependent on adhesion. When it reaches relatively higher values, adhesion becomes a factor in stripping force.

Some manufacturers have sought out relatively high adhesion levels. There need not be excessive adhesion of the coating system 31 to the glass. If the adhesion of the coating system 31 to the glass were too high, tenacious residues may occur on the surface of the fiber after the mechanical stripping operation. Such residues could affect adversely the termination of the optical fiber, for example, when attempting to insert an end portion into a passageway having a diameter of 0.005 inch and being formed in a ferrule.

It has been found that if the adhesion is in a reasonable range such as about one pound, to about five pounds of force per cm of pullout, that is sufficient to allow the optical fiber to be handled while preserving strength. Also, with these levels, it has been found that delamination of the coating system from the optical fiber does not occur.

Also of importance is low temperature loss performance of the coated optical fiber 30 over an operating temperature range. As manufacturers have gone to relatively low glass transition temperatures, problems have occurred in obtaining a relatively high level adhesion. Therefore, it has been difficult to achieve both low temperature softness and high levels of adhesion. In the coating system 31, low temperature softness has been achieved by the realization that an intermediate level of adhesion is adequate to protect against delamination even at relatively high temperature and humidity conditions. Adequate performance is achieved if there is substantially an absence of change in the level of adhesion at relatively high temperatures and humidity. As a result, a low glass transition temperature is obtained and provides acceptable low temperature performance.

Contrary to the prior art, the coating system 31 desirably is such that it is important to be in the adhesion level range set out hereinabove and to have a stable interface between the optical fiber 21 and the coating system 30 notwithstanding exposure to varying humidities. Should the adhesion level be less than that set out in the range above, it has been found that the coating system delaminated from the fiber. Within the specified range, it has been found that even under exposure to relatively high humidity, there is not cloudiness in the coating material. If there were, this would be an indication of pockets of humidity at the interface between the coating system and the glass optical fiber. A stable interface preserves the strength properties from the standpoint of static fatigue.

While others have believed that a high adhesion level is essential, the present invention contemplates optimal adhesion, not maximum, but more importantly, an interface coating to glass which is uniform and continuous. It is relatively easy to achieve optimum adhesion in a dry state but if subject to a high humidity, problems occur in prior art coating material. The coating system of this invention exhibits such adhesion levels in both dry and humid climates.

Figure 19:
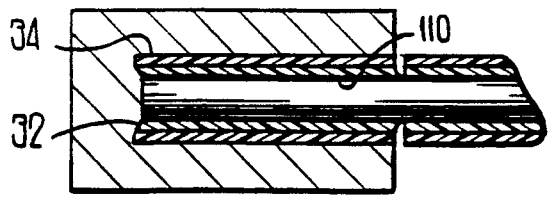
FIG. 19 is a schematic view of a pullout test for coating-to-glass adhesion conducted on a dual coated optical fiber.

In FIG. 19 is shown a pullout test which is used to examine adhesion at a coating-to-glass interface 110. If adhesion at that interface between the primary coating material 32 and the glass fiber 21 is lost, intermittent delamination may occur and performance will be affected adversely inasmuch as optical loss and strength will change. Should water form in those pockets at the interface caused by delamination, adverse results are startling. Suitable adhesion in a prescribed range must be maintained even in adverse environments.

Figure 20:
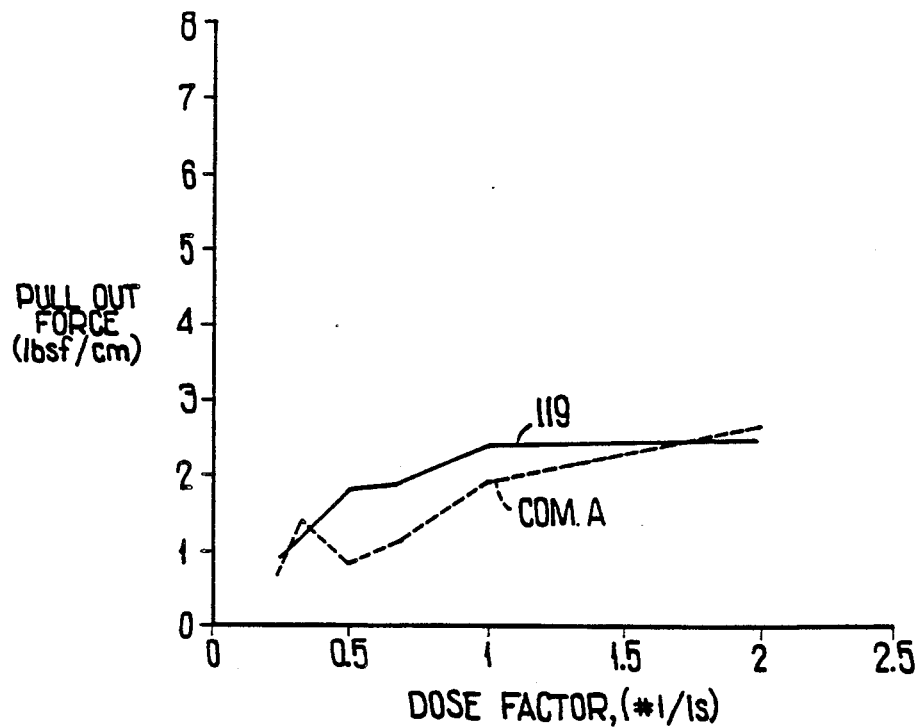
FIG. 20 is a graph of pullout force versus dose factor.
Figure 21:
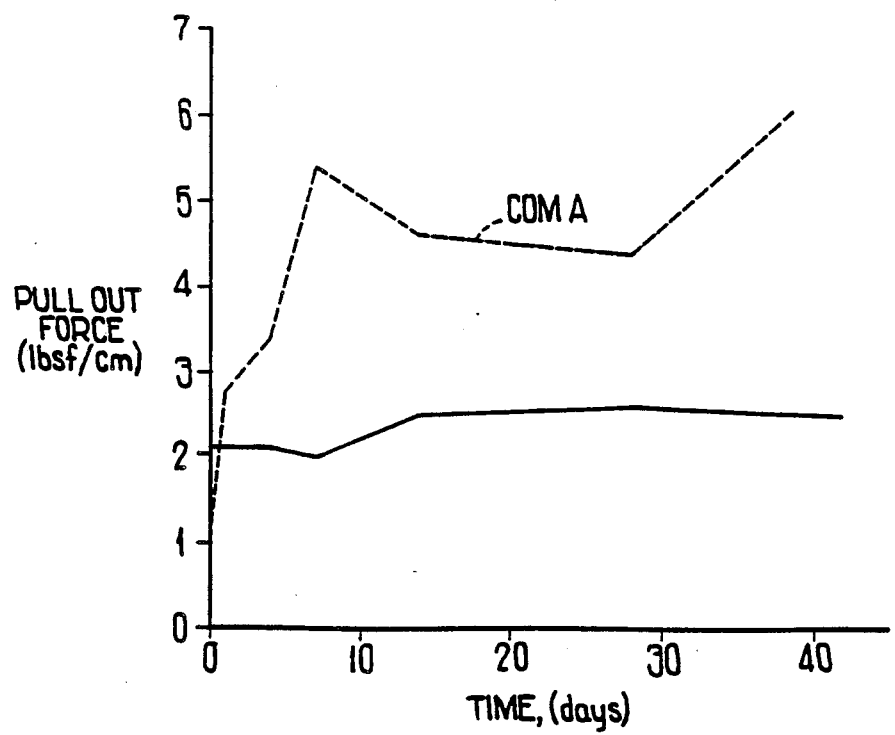
FIG. 21 is a graph of pullout force versus time.

In order to attain a stable range of adhesion, a substantially stable system is needed. As can be seen by curve 119 in FIG. 20, the pullout force for a coating system of this invention is substantially less varying that that of the prior art with dose factor above a certain level. Properties such as stripping force (see again FIG. 17) and adhesion (see FIG. 21) are substantially constant while at room temperature for a period immediately after draw. This is an equilibration period during which time the pullout was monitored. As can be seen in FIG. 21, the adhesion is at an intermediate level in the preferred range so there is no delamination during further manufacturing steps. As is known, optical fiber is subject to damage should there be any coating-to-glass delamination. On the other hand, the adhesion level of prior art materials varied substantially. For a prior art coating system shown in FIG. 21, the adhesion level began very close to 1 b at a time when the drawn optical fiber was very susceptible to damage because of movement over sheaves, for example. On the other hand, at later times when an intermediate level is desired to avoid tenacious residues, the adhesion level of the prior art system of FIG. 21 becomes relatively high.

Figure 22:
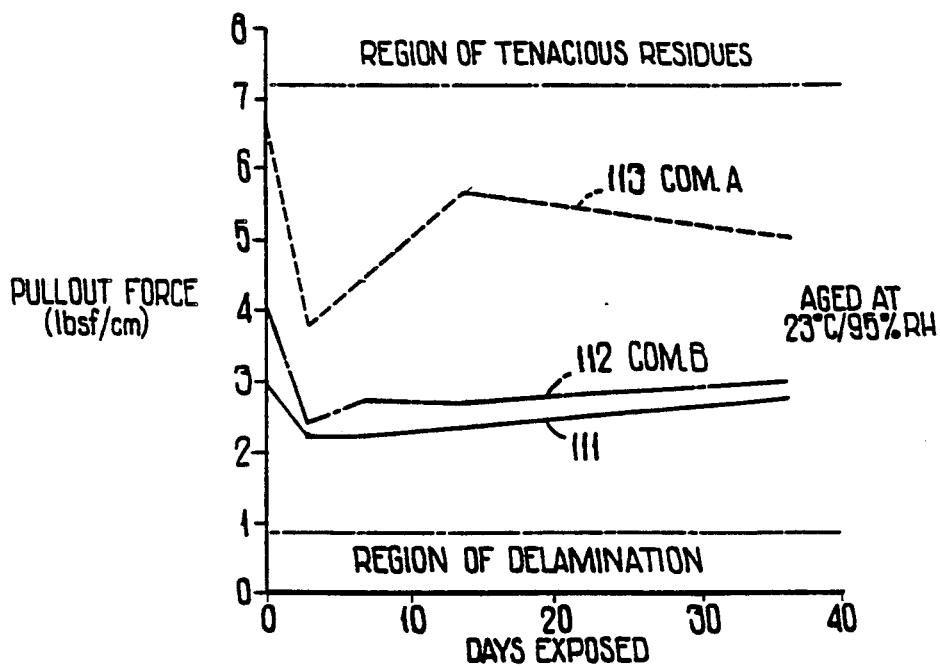
FIG. 22 is a graph which depicts the effect of aging on pullout for dual coated fiber and aged at 23° C. and 95% relative humidity.
Figure 23:
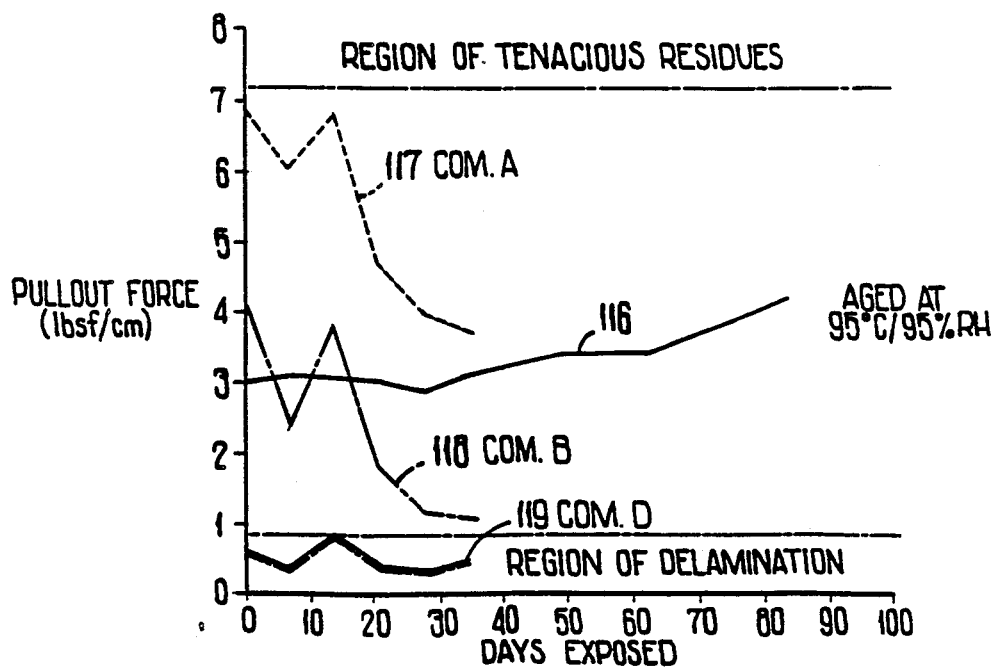
FIG. 23 is a graph which depicts the effect of aging on pullout force for dual coated fiber aged at 95° C. and 95% relative humidity.

Aging has affected adversely the results of the pullout test insofar as prior art coating systems are concerned. As can be seen in FIG. 22, a pullout force associated with a coated optical fiber of this invention and depleted by curve 111 shows little variation over time as compared to prior art coating materials depicted by curves designated by the numerals 112 and 113 under the conditions shown. A still further aging effect is shown in FIG. 23 which depicts the effect of aging on mechanical pullout force for dual coated fiber aged at 95° C. and 95% relative humidity. The coating system 31 which is represented by the curve 116 experiences some variation when subjected to these conditions but by far has less variability than other prior art materials depicted by curves 117 and 118. In fact, a commercially available coating system represented by a curve 119 dropped immediately below one pound and delaminated. The primary coating composition also required an adhesion promoter. However, the adhesion promoter which is used must be such that it does not impede the curing of coating materials.

Figure 24:
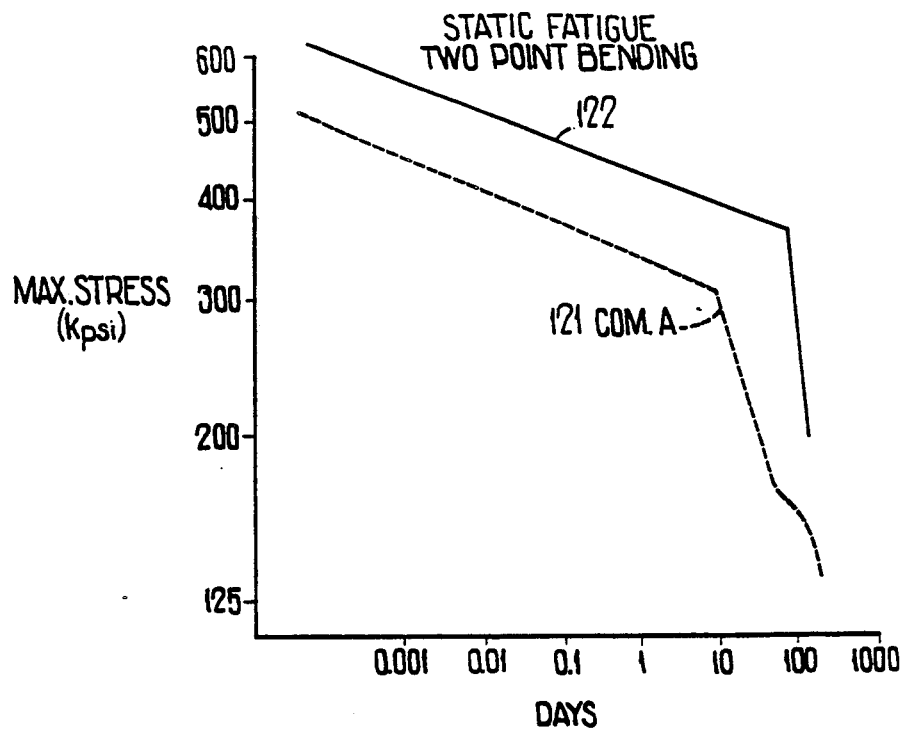
FIG. 24 is a graph which depicts static fatigue performance of coated fiber versus days of immersion in 90° C. water.

The curves of FIG. 23 also can be related to curves of FIG. 24 wherein a knee in a curve 121 which corresponds to a first transition in static fatigue performance for prior art coatings occurred in 7 to 10 days. Static fatigue deals with the ability of the optical fiber to be bent in relatively small radii without breakage. In a static fatigue test, fiber is inserted into a precision bore tube in which different radii are related to stress levels.

In a test the results of which are shown in FIG. 24, a sample of a coated fiber is immersed in a water bath having a temperature of 90° C. The optical fiber goes through a transition to rapid strength degradation in about one week. With poor adhesion, moisture penetrates into air gaps between the coating and the glass after the coating separates from the glass. Water contacts the surface of the glass and initiates stress corrosion. Once the water reaches the fiber surface, the optical fiber fails. This result, due to poor adhesion under high humidity, can be seen by comparing FIGS. 22 and 23. FIG. 22 depicts the effect of aging in pullout at room temperature and high humidity, that is in the absence of heat. Heat accelerates the aging process. Initial drops in the pullout force occur because of some moisture absorption. Although the fibers represented by curve 113 appear to be acceptable in FIG. 22, when examined at conditions of 95° C. and 95% relative humidity, it was unacceptable (see curve 117 in FIG. 23).

Figure 25:
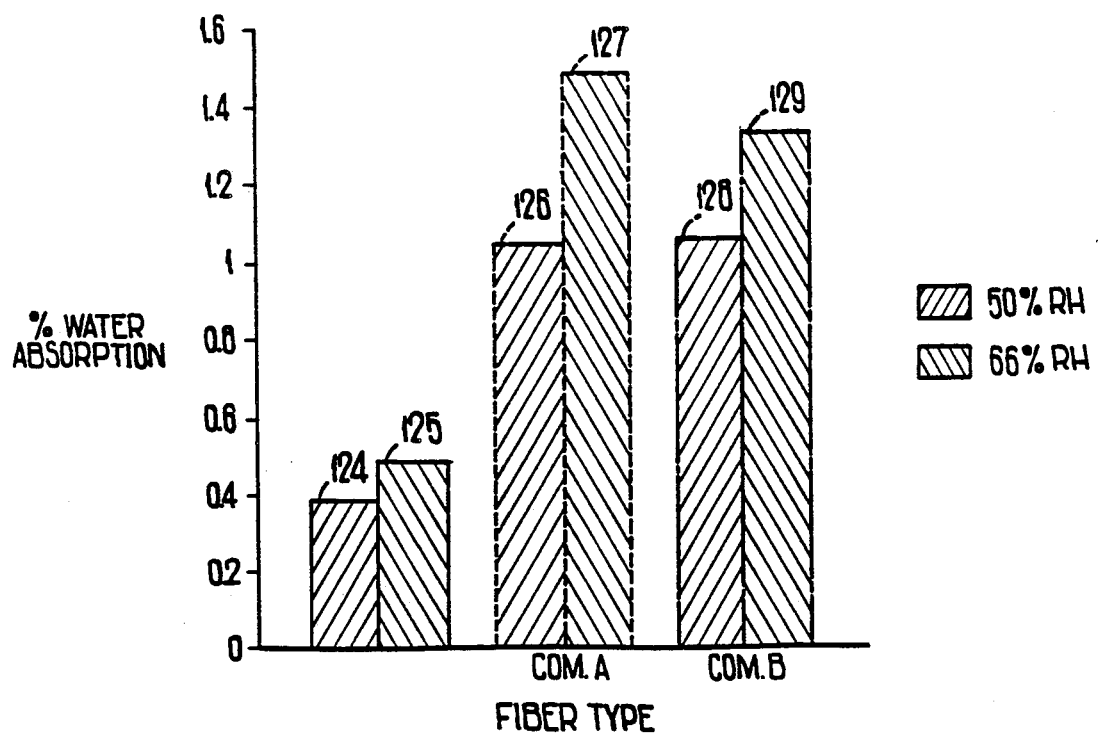
FIG. 25 is a bar chart of percent water absorption for several coating systems.

Also desired is low moisture concentration on the surface of the glass, otherwise poor static fatigue test results are obtained. In other words, it is desirable that the coating materials each have low water absorption, i.e. the coating materials be as hydrophobic as possible. The water absorption of the coated optical fiber of this invention compared to those of the prior art for two different relative humidity conditions is shown in FIG. 25. Bars 124 and 125 represent an example coated optical fiber 30 at 50% relative humidity and 65% relative humidity, respectively. Bar pairs 126 and 127 and 128 and 129 represent tests of commercially available coating materials. As for static fatigue, the object is to achieve a primary coating to the glass that is stable with no pockets of liquid that would cause an unstable interface. Should there be a high moisture absorption, outgassing of moisture occurs when a relatively thick layer of plastic which is termed a buffer layer is applied perhaps by extrusion. Without high moisture absorption, predrying of the coating material before applying the buffer layer becomes unnecessary. Further, excessive moisture caused heterogeneities at the interface with the buffer.

The coated optical fiber 30 has undergone a remarkable change from those of the prior art. This change may be attributed to controlled properties such as improved pullout performance and reduced moisture sensitivity. As can be seen in FIG. 24 which plots logarithm of stress versus log of time, the knee in the curve 121 appeared at about 1 to about 10 days for prior art coatings. However, as is seen by a curve 122 which is representative of a coating system 31 in accordance with this invention, the coated optical fiber of this invention has increased the onset of the knee from a range of about 1 to 10 days to about 100 days. This is achieved because of stable adhesion levels in a wet environment and reduced moisture sensitivity. With the coating system 31, such degradation does not occur until after about 100 days. Instead of a very high adhesion, a compromise was reached to achieve a stable interface.

Water can affect adhesion of the coating material to the glass and core and attack the polymer chains of conventional polymeric coating. Also, water is detrimental to the glass of the fiber, causing stress corrosion. What is desired is a coating material that has resistance to moisture absorption. The resistance of a coating system 31 in accordance with this invention is portrayed vividly in FIG. 24 which shows a dramatic shift in the knee of the test curve.

Subjecting the coating system to relative humidity levels of about 95% provides an indication of whether or not delamination occurs. Delamination may be prevented by controlling the adhesion level to be in the range of about 1 to 5 pounds per cm of length, by using a coating composition that does not phase separate and by using coating compositions that have a relatively low water absorption. Also, delamination below a specified dose level is more prevalent with stiffer secondary coating materials. To overcome this problem, the desired coating material of the secondary coating material 34 has an intermediate robustness and the primary coating material includes an adhesion promoter. As a result, the window in which no delamination occurs is widened. For a secondary coating material having a glass transition temperature of about 40° C., delamination does not occur until the pullout level is less than about one pound per cm for a primary coating material with an adhesion promoter.

After obtaining suitable modulus levels, coating stability needed to be addressed. Some stabilizers tended to come out of the coating composition. Also, investigations were made regarding the aging properties. A period of seven days was used as an aging time during which color change was evaluated. The coating composition also includes an anti-oxidant stabilizer. The coating system 31 of the coated optical fiber 30 must not discolor with time.

Also, the outer surface of the secondary coating material must allow handling of the fiber and winding in convolutions without undesired adhesion of each convolution to portions of adjacent convolutions. As will be recalled, if undesired surface tack exists, blocking and undesired difficulties in the payout of convolutions will occur. Generally, undesired tack of this outer coating material occurs because an outer layer thereof is undercured. This may be avoided by curing the coated optical fiber in the presence of nitrogen.

Further, the outer surface of the secondary coating material should be relatively slick to reduce friction thereof when the coated fiber engages other surfaces including those of other fibers. Reduced friction is obtained by an optimum combination of glass transition temperature, secondary coating material equilibrium modules and controlled processing variables.

The secondary coating material also must be such that a buffering material such as a polyvinyl chloride (PVC) composition or a colorant material may be applied thereto. An outer surface receptive to buffering or inking must have suitable mixture and be comprised of a material which is compatible with a buffering material or an ink.

What is important to recognize is that the many properties are achieved but not perhaps to maximum levels. Instead, with some there may have to be a trade off to achieve one property which generally has been viewed as counter to another property desired. For example, a targeted low modulus in order to achieve low loss may have required that a fast cure speed be compromised somewhat. For acceptable strength, the art has attempted to maximize adhesion. However, for the coating materials of this invention, it was thought that the adhesion level could be attained only by compromising other important properties such as a fast cure speed, consistent coating lots, low moisture sensitivity and the capability of stripping by mechanical means. Such compromises were found to be unnecessary with the coating system 31.

Figure 26:
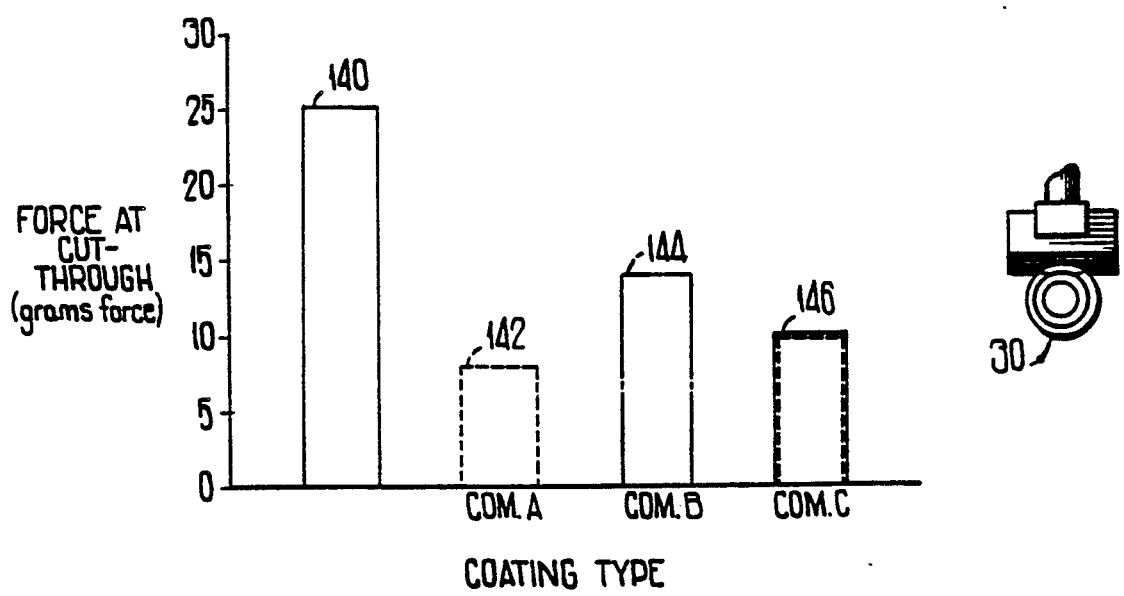
FIG. 26 is a bar chart which depicts a comparison of cut-through force for coated optical fiber of this invention and for prior art coated optical fiber.

In FIG. 26, there is shown a comparison of cut-through resistance for coated optical fiber 30 as compared to those of the prior art. Cut-through resistance is relatively high. The surface and the contour of the optical fiber are free of cracks. In that configuration, if free of cracks and defects, the coating system will exhibit much higher strength. As a result, there is very acceptable cut-through resistance. A bar designated by the numeral 140 depicts that property for a coated optical fiber 30 in which the glass transition temperature of the secondary coating material was 40° C. whereas bars 142, 144 and 146 depict those for optical fiber coated with prior art materials. The glass transition temperatures for the sample represented by bar 142, was 25° C. The sample represented by a bar 144 was found to have a composite $T_g$ which ranged from 20°–36° C. whereas the sample represented by a bar 146 was found to have a composite $T_g$ which ranged from 10°–36° C. From FIG. 26, it should be clear that a correlation exists between $T_g$ and cut-through resistance. The $T_g$ of the secondary coating material 34 led to increased cut-through resistance. However, too high a $T_g$ will result in a delamination of the primary coating and increased loss because of reduced compliancy of the secondary coating.

A coating system 31 in accordance with the solution set of properties this invention desirably exhibits excellent aging and reliability properties and excellent optical loss performance. There should be absence of change in the properties when subjected to various operating conditions and aging tests. In order to measure properties on optical fiber, tests had to be developed. After the properties were measured, performance which is a function of properties was assessed. A connection was made between properties on the optical fiber and performance. For example, elongation has been related to strippability. The prior art has not addressed the properties in such a global sense as has been done herein.

Coated optical fiber 30 of this invention exhibits high quality and consistency, little or no odor, improved cut-through resistance, slick fiber surface, reduced moisture sensitivity, minimum yellowing and no opacity and reduced mechanical strip force. Further, it has suitable microbending resistance, over a predetermined temperature range, e.g. one in which a lower limit does not exceed about −40° C. and an upper limit does not exceed about 85° C., low temperature loss performance, static fatigue resistance and excellent aging and reliability.

Attainment of these properties is related to specific parameters. For example, cure speed relates to consistency. Greater consistency between spools of optical fiber is achieved because the cure speed of the coating materials 32 and 34 have been improved. Constituents of specific coating materials should not cause yellowing, otherwise, identification colors of the fibers may not be discernible.

Figure 6:
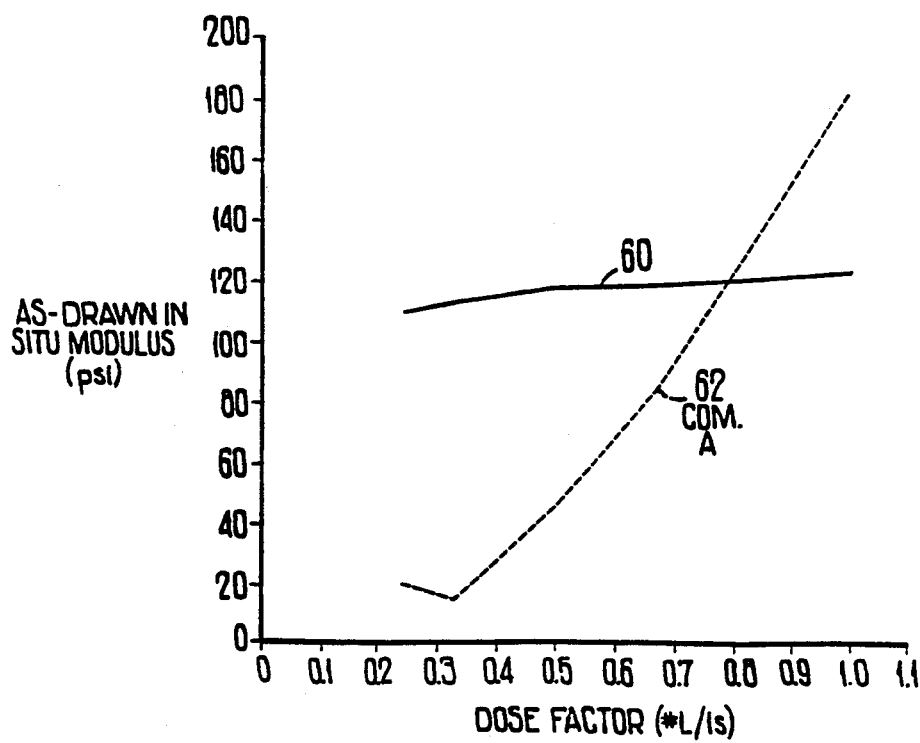
FIG. 6 is a plot of as-drawn, in situ modulus versus dose factor of a prior art coating material and a coating material of this invention.

As will be recalled, in FIG. 6, there is shown a plot of cure speed as a function of dose factor. At a 0.4 dose factor, for example, the prior art coating system exemplified by the curve 62 is not fully cured, but as an be seen, the ones of this invention are. The coating materials characterized in accordance with this invention cure more completely with lower levels of radiation.

Figure 27:
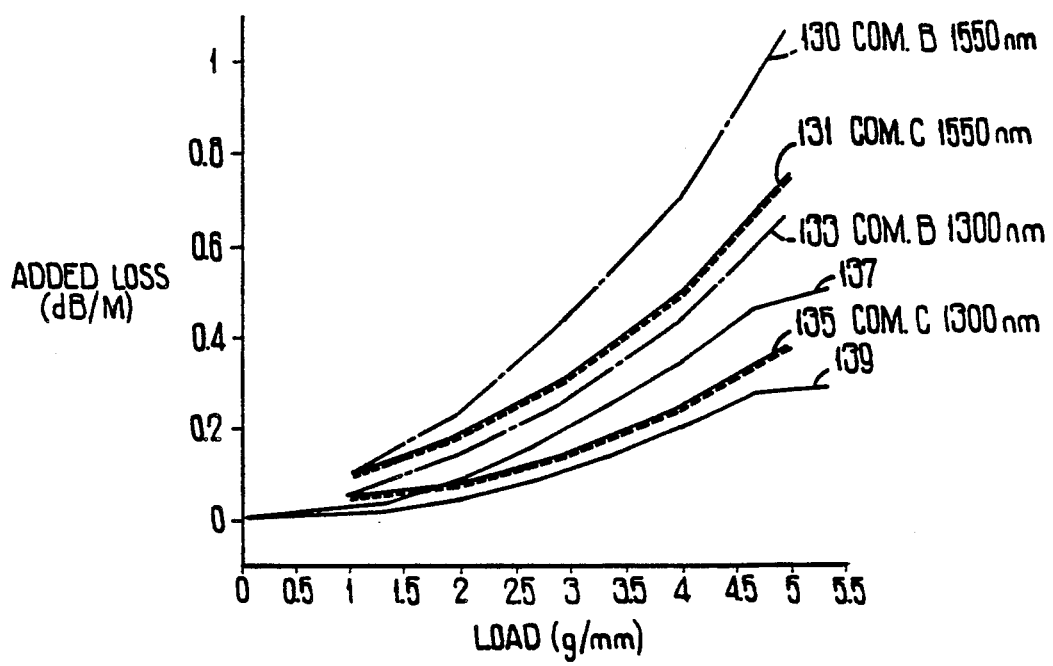
FIG. 27 is a graph of added loss versus load.

Going now to FIG. 27 there is shown a graph depicting results of a press test wherein fiber is positioned between two plates faced with 150 grit sandpaper. The sandpaper is forced into the coating system by compressive forces applied to the platens. The compression causes the core of the fiber to be slightly deflected causing microbending. This is somewhat analogous to the lateral experienced by the fiber during cable making. The stiffer the coating system, the more sensitive to microbending. As can be seen, added loss for prior art fibers represented at the 1300 and 1550 nm wavelengths, respectively, by pairs of curves 130 and 131 and 133 and 135 result in added loss which is higher than that for the coated optical fiber of this invention represented by curves 137 and 139.

Figure 28:
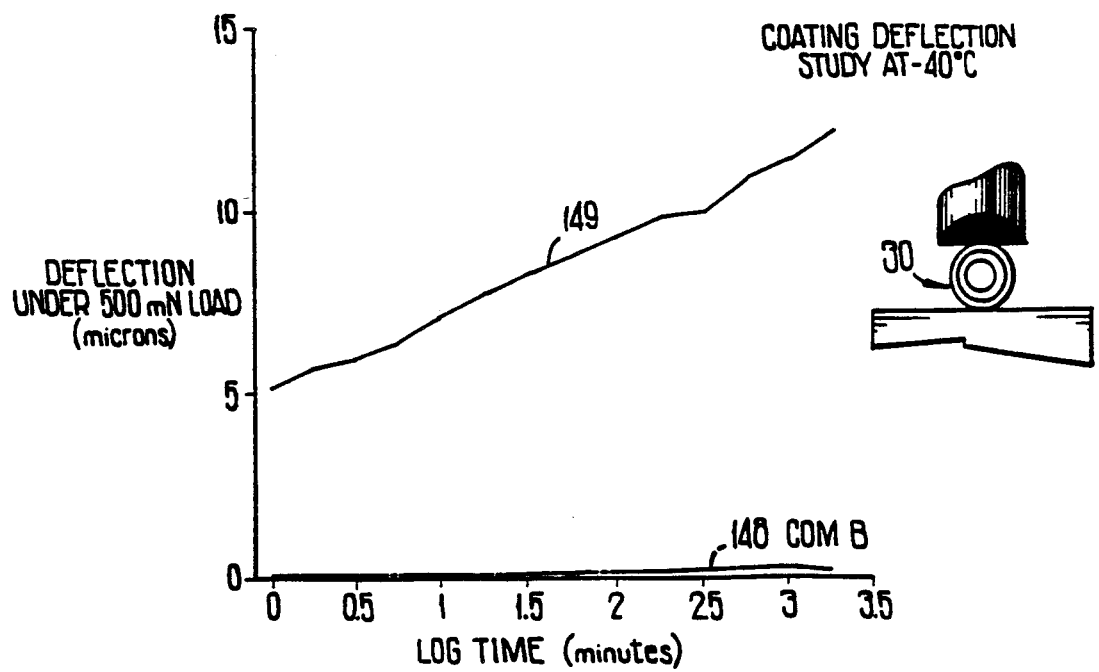
FIG. 28 is a graph which depicts the deflection of a coating material of a coated optical fiber made by the methods of this invention.

In FIG. 28, there are depicted the results of a coating deflection study conducted at −40° C. Critical parameters are the primary moduli at room temperatures and at −40° C. The results are a measure of softness of the primary coating material at −40° C. The results are a measure of softness of the primary coating material at −40° C., the extent to which the probe deforms and causes deflection at −40° C. is a measure of modulus at −40° C. FIG. 28 is an on fiber measurement of softness. The more soft the primary coating material is, the more likely it is to resist lateral loading and therefore microbending. A prior art coating curve 140 along the X axis shows substantially no deflection whereas with the coating of this invention, and as shown by a curve 142 the probe moves quite readily.

The primary coating material of coated optical fiber 30 is characterized as being substantially more compliant at low temperatures than those of the prior art. At relatively short times, all the coating materials are relatively stiff, but at 48 hours, the prior art primary coating materials exhibit significantly more stiffness than that of coated optical fiber 30 which at that time has relaxed substantially into its equilibrium modulus.

It becomes instructive to consider FIGS. 7 and 27 and 28 together. In FIG. 28 is shown coating deflection caused by a loaded probe, this being on-fiber data. As can be seen in FIG. 28 with a relatively hard secondary coating, deflection can only occur if the primary coating material deflects. The curve designated 142 represents coated optical fiber 30 which includes a primary coating material having a glass transition temperature of about −45° C. Another curve, one designated 140, represents prior art optical fiber which includes a primary coating material having a glass transition temperature of about −28° C. As is seen at a temperature of −40° C., there is no deflection of the prior art fiber. As a result, the coating system of the fiber represented by the curve 140 is unable to deflect to absorb lateral loading and loss increases. This also is shown in FIG. 7. There, for coated optical fiber loss is low even at −40° C. and even after aging for 5 days and tested at −40° C. However, for prior art coatings in which the primary glass transition temperature is higher, the loss, particularly after aging, goes high.

FIG. 27 also is important regarding this matter. As seen by a comparison of curves 130, 131, and 137 at 1550 nm, added loss in the press test is substantially higher for prior art coatings. The composite coating system 31 of coated optical fiber 30 does much better with the combination of the secondary coating material with its relatively high cut-through resistance and with the primary coating material having a defined relatively low equilibrium modulus which results in lower added loss in the press test than with prior art coating systems.

In a method of making an optical fiber transmission media of this invention, optical fiber 21 drawn from a preform rod is moved through a coating apparatus as such as that disclosed in priorly mentioned U.S. Pat. No. 4,474,830 which is incorporated by reference hereinto. The apparatus 25 is used to apply the primary coating material and the secondary coating material in tandem.

After both coating materials have been applied, they are cured simultaneously. In the preferred embodiment, the coating materials are radiation curable and more specifically UV curable coating materials. The primary coating material may be applied and cured after which the secondary coating material is applied and cured. Or, both coating materials may be applied as is shown in U.S. Pat. No. 4,474,830 and then cured.

Afterwards, one or a plurality of optical fibers 30—30 is provided with a sheath system to form a cable. As seen in FIG. 29, the cable 150 includes a plurality of units 152—152 of optical fibers 30—30 each unit held together by a binder 153. The units 152—152 are enclosed in a core tube 154 which is made of a suitable plastic material. About the core tube may be disposed a metallic shield 156 and a strength member system 157. The strength member system 157 may include a plurality of longitudinally extending strength members. Enclosing the strength member system and shield is a plastic jacket 159. An optical fiber cable is disclosed in U.S. Pat. No. 4,765,712 which issued on Aug. 23, 1988 in the names of W. D. Bohannon, Jr., et al. and which is incorporated by reference hereinto.

It is to be understood that the above-described arrangements are simply illustrative of the invention. Other arrangements may be devised by those skilled in the art which will embody the principles of the invention and fall within the spirit and scope thereof.

I claim:

1. A method of making an optical fiber cable, said method comprising the steps of:
   providing an optically suitable preform;
   drawing optical fiber from the preform;
   applying a first coating material to the drawn optical fiber, the first coating material having an equilibrium modulus which is in the range of about 70 to about 150 psi and a glass transition temperature which is not greater than about −40° C. which are such as to provide suitable resistance to microbending over a predetermined temperature range, and having an adhesion to the optical fiber which is substantially uniform and continuous and free from delamination and heterogeneous materials at the interface between optical fiber and the first coating material, which is optimal to avoid tenacious residues on the optical fiber after the first coating material is removed from the optical fiber and which is substantially constant with respect to time, said modulus spectrum, glass transition temperature and adhesion being substantially maintained under relatively high humidity and relatively long aging conditions;
   applying a second coating material to the first coating material; the second material having a sufficiently low glass transition temperature to avoid delamination of the first and second coating materials from the optical fiber and to provide suitable resistance to microbending wherein said second coating material has a glass transition temperature in the range of from about 20° C. to about 60° C. and an equilibrium modulus in the range of from about 1000 to about 5000 psi.
   curing the first and the second coating materials, the modulus of the first coating material as measured on the optical fiber over a range of dose factor of about 0.1 to 2 being substantially constant;
   taking up the drawn optical fiber having the first and second coating materials applied thereto;
   paying out the drawn optical fiber; and
   causing a sheath system to enclose the optical fiber.

2. The method of claim 1, wherein each of said coating materials is a radiation curable coating material.

3. The method of claim 2, wherein each of said coating materials is UV light curable.

4. The method of claim 2, wherein wherein said predetermined temperature range is such that a lower limit of the range does not exceed about −40° C. and the upper end of the range extends to about 85° C.

5. The method of claim 4, wherein said second coating material is one which is characterized a glass transition temperature which is such as to allow the optical fiber to be handled in ambient conditions and which is sufficiently low to allow said secondary coating material to relax with time and become relatively compliant.

6. The method of claim 5, wherein said second coating material is one which is characterized by an elongation which is less than about 40%.

7. The method of claim 6, wherein said adhesion is in the range of from about 1 to 5 pounds of force per cm of pullout.

8. The method of claim 1, wherein said first coating material is cured prior to the application of said second coating material.

9. The method of claim 1, wherein said first and second coating materials are cured after the application of said first and second coating materials.

* * * * *